(12) United States Patent
Kenkel

(10) Patent No.: US 10,985,799 B1
(45) Date of Patent: Apr. 20, 2021

(54) BI-DIRECTIONAL MULTI-BAND FREQUENCY MANAGER FOR A WIRELESS MICROPHONE SYSTEM

(71) Applicant: Shure Acquisition Holdings, Inc., Niles, IL (US)

(72) Inventor: Mark Allen Kenkel, Schaumburg, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 16/743,113

(22) Filed: Jan. 15, 2020

(51) Int. Cl.
H04B 1/7156 (2011.01)
H04W 72/04 (2009.01)
H04R 1/20 (2006.01)

(52) U.S. Cl.
CPC ........... *H04B 1/7156* (2013.01); *H04R 1/20* (2013.01); *H04W 72/0453* (2013.01); *H04R 2420/07* (2013.01)

(58) Field of Classification Search
CPC .... H04B 1/7156; H04R 1/20; H04R 2420/07; H04W 72/0453
USPC .......................... 375/132; 455/502
See application file for complete search history.

(56) References Cited

U.S. PATENT DOCUMENTS

| | | | |
|---|---|---|---|
| 6,178,248 B1 | 1/2001 | Marash | |
| 7,027,775 B2 | 4/2006 | Kamimura | |
| 7,057,472 B2 | 6/2006 | Fukamachi et al. | |
| 7,221,911 B2 | 5/2007 | Knobel et al. | |
| 7,756,058 B2 | 7/2010 | Cordeiro et al. | |
| 8,350,763 B2 | 1/2013 | Rappaport | |

(Continued)

FOREIGN PATENT DOCUMENTS

| | | |
|---|---|---|
| CN | 101350628 A | 1/2009 |
| CN | 203039882 U | 7/2013 |

(Continued)

OTHER PUBLICATIONS

Digisol DG-WR4801AC AC750 Dual-Band Wireless Repeater (White), Amazon.com, Aug. 2019.

(Continued)

*Primary Examiner* — Fitwi Y Hailegiorgis
(74) *Attorney, Agent, or Firm* — Banner & Witcoff, Ltd.

(57) ABSTRACT

A frequency manager in a multi-band wireless microphone system provides the synchronization of fixed RF devices (for example, transceivers) operating in distant parts (for example, two or more frequency bands) of the frequency spectrum. Each transceiver may be paired with a wireless microphone and provides synchronization with the paired wireless microphone. Antenna signals are separated or combined into a plurality of frequency bands using a multi-band filter. Band-specific low noise amplifiers and power amplifiers may be utilized for each frequency band so amplifier performance can be optimized. Prior to distribution by a splitter, the plurality of frequency bands is combined or separated using a second multi-band filter. Transceivers that are connected to the frequency manager may then independently operate in one band, different frequency bands or a combination of bands. A cascade feature allows multiple frequency managers to synchronize, further increasing the system's simultaneous microphone channel capacity.

22 Claims, 15 Drawing Sheets

(56) References Cited

U.S. PATENT DOCUMENTS

| | | | |
|---|---|---|---|
| 8,730,833 | B2 | 5/2014 | Drucker |
| 8,929,937 | B2 | 1/2015 | Schmidt et al. |
| 8,958,845 | B2 | 2/2015 | Alexopoulos et al. |
| 9,071,913 | B2 | 6/2015 | Koch et al. |
| 9,179,451 | B2 | 11/2015 | Scipione et al. |
| 9,332,439 | B2 | 5/2016 | Chandra et al. |
| 9,413,500 | B2 | 8/2016 | Chincholi et al. |
| 9,520,935 | B2 | 12/2016 | Goodson et al. |
| 9,544,685 | B2 | 1/2017 | Wang |
| 9,763,117 | B2 | 9/2017 | Amini et al. |
| 2002/0173337 | A1 | 11/2002 | Hajimiri et al. |
| 2011/0080847 | A1 | 4/2011 | Kenkel et al. |
| 2011/0210787 | A1 | 9/2011 | Lee et al. |
| 2012/0114134 | A1 | 5/2012 | Li et al. |
| 2013/0040674 | A1* | 2/2013 | Chang ............... H04W 56/0015 455/502 |
| 2013/0301544 | A1 | 11/2013 | Drucker |
| 2014/0334635 | A1 | 11/2014 | Larsson et al. |
| 2019/0230653 | A1 | 7/2019 | Mansouri et al. |

FOREIGN PATENT DOCUMENTS

| | | |
|---|---|---|
| CN | 103096213 B | 6/2015 |
| CN | 206181302 U | 5/2017 |
| EP | 2898602 A1 | 7/2015 |
| GB | 2444980 A | 6/2008 |
| WO | 2019003555 A1 | 1/2019 |

OTHER PUBLICATIONS

Shentesel 600 Mbps Dual Band 2.4/5Ghz Wireless USB WiFi Network Card Adapter with Antenna, Amazon.com, Aug. 2019.

Broadcast Audio the Bridge Connecting IT to Broadcast, Sennheiser Simplifies Set Up with Free Wireless Systems Manager Software, <https://www.thebroadcastbridge.com/content/entry/574/sennheiser-simplifies-set-up-with-f . . . >, Aug. 2019.

Mar. 5, 2021—(WO) International Search Report and Written Opinion—App PCT/US2020/061481.

* cited by examiner

BI-DIRECTIONAL MULTI-BAND FREQUENCY MANAGER FOR A WIRELESS MICROPHONE SYSTEM

TECHNICAL FIELD

One or more aspects of the disclosure generally relate to a wireless microphone system that operates at two or more frequency bands.

BACKGROUND

Multiple (sometimes many) wireless microphones are typically utilized in order to have a desired coverage for a performance/entertainment venue. However, to do so, each wireless microphone is typically assigned one or more frequencies in an available frequency spectrum. Frequency assignment may present a number of challenges when configuring and operating a wireless microphone system for the venue.

Wireless microphones are prone to interference, dropouts, and may other radio frequency (RF) problems. For example, RF interference may be caused by other wireless microphones, wireless telephone services, facility lighting, and so forth. These problems may be disastrous for both live productions and installed systems. When a wireless microphone suffers from static or intermediate dropouts during a live event, the event is often spoiled. Malfunctions lasting even a fraction of a second can throw off presentations and performances, causing consternation and apprehension for technical crews, event coordinators, and the audience. Consequently, any improvements to frequency assignment to wireless microphones and associated rack equipment would be beneficial to wireless microphone systems.

SUMMARY

This summary is provided to introduce a selection of concepts in a simplified form that are further described below in the Detailed Description. This Summary is not intended to identify key features or essential features of the disclosure.

A frequency manager in a wireless microphone system provides multi-band, bidirectional operation. The frequency manager supports the synchronization of fixed radio frequency (RF) devices (for example, transceivers) that may operate in distant parts of the frequency spectrum. Each transceiver may be paired with a wireless microphone and provides synchronization with the paired wireless microphone.

Antenna signals may be separated or combined into two or more bands using a multi-band filter (for example, a diplexer) instead of a traditional broadband RF splitter or RF band selection switch. This approach may reduce signal loss, improve receiver sensitivity, and reduce transmitter power amplifier (PA) gain requirements. Band-specific low noise amplifiers (LNAs) and PAs may be utilized for each frequency band so that amplifier performance can be improved over that of single broadband LNA or PA.

Prior to the RF distribution by a splitter, frequency bands are combined or separated using another multi-band filter. The frequency manager allows transmitter and receiver timing synchronization in a plurality of frequency bands simultaneously. Transceivers connected to the frequency manager may then independently operate in one band or parts of the plurality of bands.

With some embodiments, each transceiver may operate in one or another frequency band. The frequency manager may increase system channel capacity by synchronizing transmit and receive timing across all connected microphone channels. A cascade feature allows multiple frequency managers to synchronize further increasing the system's simultaneous microphone channel capacity.

With another aspect of the disclosure, a frequency manager in a wireless microphone system manages frequency spectra for a plurality of transceivers paired with a plurality of wireless microphones. A first multi-band filter is bi-directionally connected to a first antenna and configured to receive a received radio frequency (RF) signal and to transmit a transmitted RF signal simultaneously on a plurality of frequency bands (for example, a first frequency band and a second frequency band centered around 2.4 GHz and 5.5 GHz). The frequency manager receives a received RF signal (comprising a received component from each supported wireless microphone) from the paired wireless microphones, and transmits a transmitted RF signal comprising a transmitted component to each paired wireless microphone. Separate processing circuits are bi-directionally connected between the first multi-band filter and a second multi-band filter and are configured to electrically process the received and transmitted RF signals for each supported frequency band. An RF splitter/combiner, which is bi-directionally connected to the second multi-band filter, combines transmitted components into the transmitted RF signal, split the received RF signal into RF portions, and directs the RF portions to the supported transceivers.

With another aspect of the disclosure, a first transceiver may operate at the first frequency band while a second transceiver operates at the second frequency band during a particular time duration (for example, sub-frame) of the received and transmitted RF signals. For example, the frequency bands may be centered around 2.4 GHz, 5.5 GHz, 1.8 GHz, and/or 902 MHz.

With an aspect of the disclosure, a frequency manager may be connected to two or more antennas to supported antenna diversity. This approach provides additional signal robustness with respect to a single antenna.

With another aspect of the disclosure, supported transceivers may be connected to an A-port and a B-port of a frequency manager. When the frequency manager determines that a first transceiver is connected to an A-port and a B-port, the frequency manager may assign a frequency group (comprising one or more frequencies spanning one or more frequency bands) to the first transceiver. The frequency manager may assign the same frequency group to a second transceiver; however, the first and second transceivers will operate at different frequencies in the frequency group during a given transmit or receive sub-frame.

With another aspect of the disclosure, a frequency manager may periodically attempt to communicate with a transceiver via an A-port. When a response is received via an associated B-port, the frequency manager determines that the transceiver is connected.

With another aspect of the disclosure, a frequency manager attempts to communicate to a first antenna port. When a response is received over a second antenna port, the frequency manager determines that it is connected to an upstream manager and not to an antenna. Consequently, the frequency manager may interact with the upstream frequency manager via the antenna ports.

With another aspect of the disclosure, a frequency manager assigns a frequency group and frequency hopping sequence to a transceiver, where frequencies in the group may be in both a first frequency band and a second frequency band. Consequently, the transceiver can move from one frequency band to a different frequency band during the frequency hopping sequence.

With another aspect of the disclosure, additional transceivers may be supported with a cascaded (downstream) frequency manager.

With another aspect of the disclosure, a frequency manager determines capabilities of connected transceiver and selects at least one transceiver to serve as a frequency scanner. For example, the selected transceiver may be able to support multiple frequency bands. The frequency manager may be able to identify unoccupied frequencies from scanner information and to assign those frequencies to the connected transceivers.

With another aspect of the disclosure, a transceiver sends operational data to a paired wireless microphone over a transmitted RF signal. The wireless microphone uses this information when sending data to the transceiver. With some embodiments, the transceiver and the paired wireless microphone may use the same frequency group and frequency hopping sequence.

BRIEF DESCRIPTION OF THE DRAWINGS

A more complete understanding of the exemplary embodiments of the present invention and the advantages thereof may be acquired by referring to the following description in consideration of the accompanying drawings, in which like reference numbers indicate like features and wherein.

DETAILED DESCRIPTION

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

With traditional approaches, multi-band operation for a wireless microphone system often uses a broadband radio frequency (RF) splitter or RF band selection switch. These traditional approaches may increase signal loss, degrade receiver sensitivity, and increase transmitter power amplifier (PA) gain requirements. Moreover, the need for configuring an RF band selection switch may preclude simultaneous operation in a plurality of frequency bands.

Aspects of the disclosure relate to a frequency manager in a wireless microphone system providing multi-band, bidirectional operation. The frequency manager supports the synchronization of fixed radio frequency (RF) devices (for example, transceivers) that may operate in distant parts of the frequency spectrum. Each transceiver may be paired with a wireless microphone and provide synchronization with the paired wireless microphone.

Figure 1:
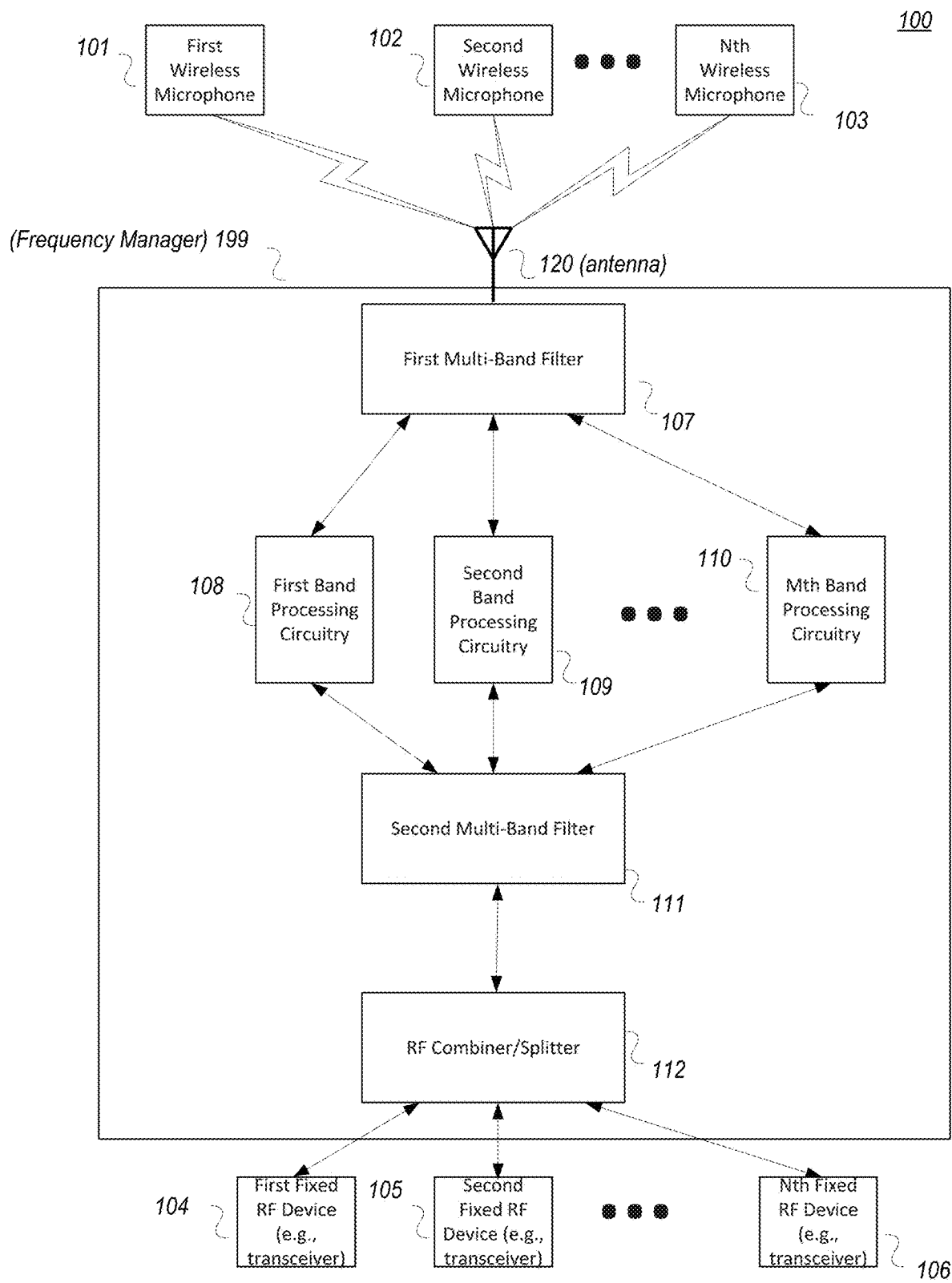
FIG. 1 shows a wireless microphone system in accordance with an aspect of the embodiments.

FIG. 1 shows wireless microphone system 100 in accordance with an aspect of the embodiments. Wireless microphone system 100 comprises frequency manager 199, transceivers 104-106, and wireless microphones 101-103.

Frequency manager 199 provides multi-band, bidirectional operation. Frequency manager 199 supports the synchronization of fixed radio frequency (RF) devices (for example, transceivers 104-106) that may operate in distant parts of the frequency spectrum. Each transceiver 104-106 may be paired with a wireless microphone 101-103 and provides synchronization with a paired wireless microphone. Embodiments may support other types of devices including personal stereo monitors and wireless remote sensing devices (for example, temperature probes, pressure gauges, and personal digital assistants).

Frequency manager 199 manages frequency spectra to transceivers 104-106 paired with wireless microphones 101-103. First multi-band filter 107 is bi-directionally connected to antenna 120 and is configured to receive a received radio frequency (RF) signal from transceivers 104-106 and to transmit a transmitted RF signal simultaneously on a plurality of frequency bands (for example, a first frequency band and a second frequency band centered around 2.4 GHz and 5.5 GHz) to transceivers 104-106.

Separate processing circuits 108-110 are bi-directionally connected between first multi-band filter 107 and second multi-band filter 111 and is configured to electrically process the received and transmitted RF signals for each supported frequency band. RF splitter/combiner 112, which is bi-directionally connected to second multi-band filter 111, combines transmitted components into the transmitted RF signal, splits the received RF signal into RF portions, and directs the RF portions to supported transceivers 104-106.

Embodiments may support simultaneous operation at more than two frequency bands, where each frequency band has an associated processing circuit 108-110. For example, a wireless microphone system may support frequency bands at 2.4 GHz, 5.5 GHz, and 1.8 GHz or at 2.4 GHz, 5.5 GHz, 1.8 GHz, and 902 MHz.

While FIG. 1 shows only one antenna (for example, antenna 120), embodiments may use two or more antennas to provide antenna diversity, where a plurality of RF signals from the antennas are combined. This concept will be further discussed with FIG. 2.

While not explicitly shown, audio outputs from transceivers 104-106 are combined in an audio playback network (for example, one or more speakers distributed in an entertainment venue).

While FIG. 1 shows a wireless microphone system, embodiments of the disclosure may support a communication system for wireless telephony, including base stations that interact with wireless portable devices.

Embodiments may support wireless microphones that are multi-band capable and/or that are single-band capable. Furthermore, embodiments may support backwards compatibility with legacy single-band wireless microphones.

Figure 2:
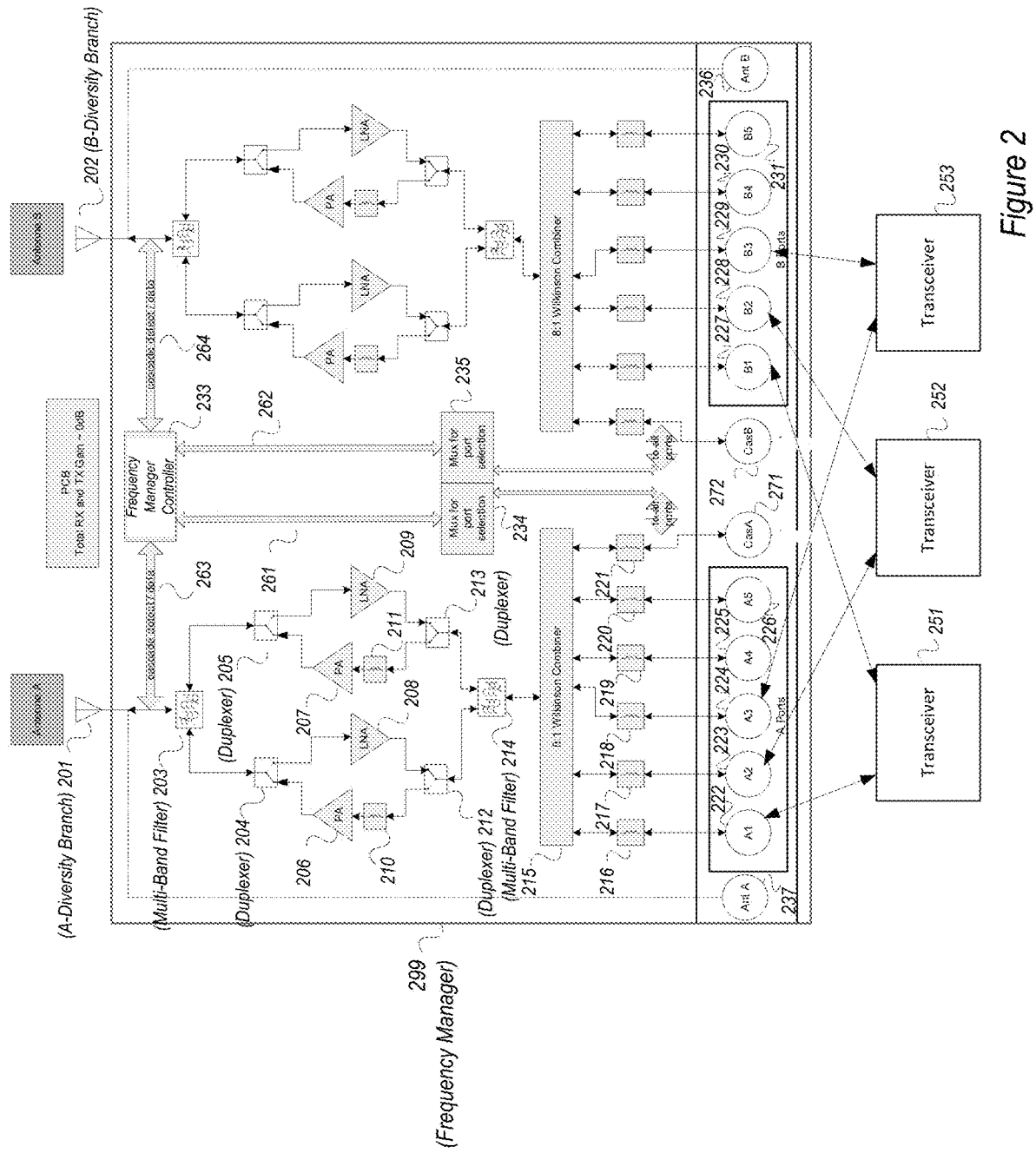
FIG. 2 shows a frequency manager supporting two frequency bands in accordance with an aspect of the embodiments.

FIG. 2 shows frequency manager 299 supporting two frequency bands (for example, 2.4 GHz and 5.5 GHz) in accordance with an aspect of the embodiments.

Embodiments may extend to more than two operating frequency bands by implementing a triplexer or higher order band split filter. Also, embodiments may support 2.4 GHz, 5.5 GHz, 1.8 GHz, and/or 902 MHz frequency bands.

Frequency manager 299 supports frequency coordination, TX/RX time synchronization, and antenna distribution functions for bidirectional wireless microphone systems. Signals from both frequency bands are distributed from frequency manager 299 to all RF ports 222-231 simultaneously. A random mix of transceivers operating in each band may be connected and serviced by frequency manager 299 without requiring the user to preselect the band of operation.

While frequency manager 299 supports antenna diversity through antenna 201 (A-diversity branch) and antenna 202 (B-diversity branch), the portion associated with the A-diversity branch will be discussed in detail. The portion associated with the B-diversity branch operates in a similar fashion.

Each supported transceiver 251-253 receives/transmits an RF signals from/to antenna 201 and antenna 202 via an associated A-port and B-port, respectively. For example, transceiver 251 is connected to A-port 222 and B-port 227. In addition, as will be discussed in greater detail, frequency manager controller 233 sends data to transceivers 251-253 and receives data from transceivers 251-253 through A-ports 222-226 and B-ports 227-231, respectively, where data may be formatted into one or more messages. Messages may include message type, originating device identification, destination device identification, and the data.

With some embodiments of the disclosure, frequency manager 299 may alternatively send a message (for example, a command) on the same port (for example, an A-port) to an RF device (for example, transceiver) as for receiving a response using a bi-directional configuration on the port.

In addition, frequency manager controller 233 sends timing data to supported transceivers 251-253 over A-ports 222-226 so that transceivers 251-253 are synchronized together. Consequently, transceivers 251-253 will change operating frequencies at the same time.

With some embodiments, transmission of data to/from transceivers 251-253 may utilize an RF signal through A-ports 226 and B-port 227-231 by modulating the RF signal with a DC component or a tone.

Frequency manager controller 233 sends data to transceivers 251-253 via data link 261, multiplexer 234, and A-ports 222-224, respectively, and receives data from transceivers 251-253 via data link 262, multiplexer 235, and B-ports 227-229, respectively. Frequency manager controller 233 selects one of transceivers 251-253 to communicate with through multiplexers 234 and 235.

Figure 9:
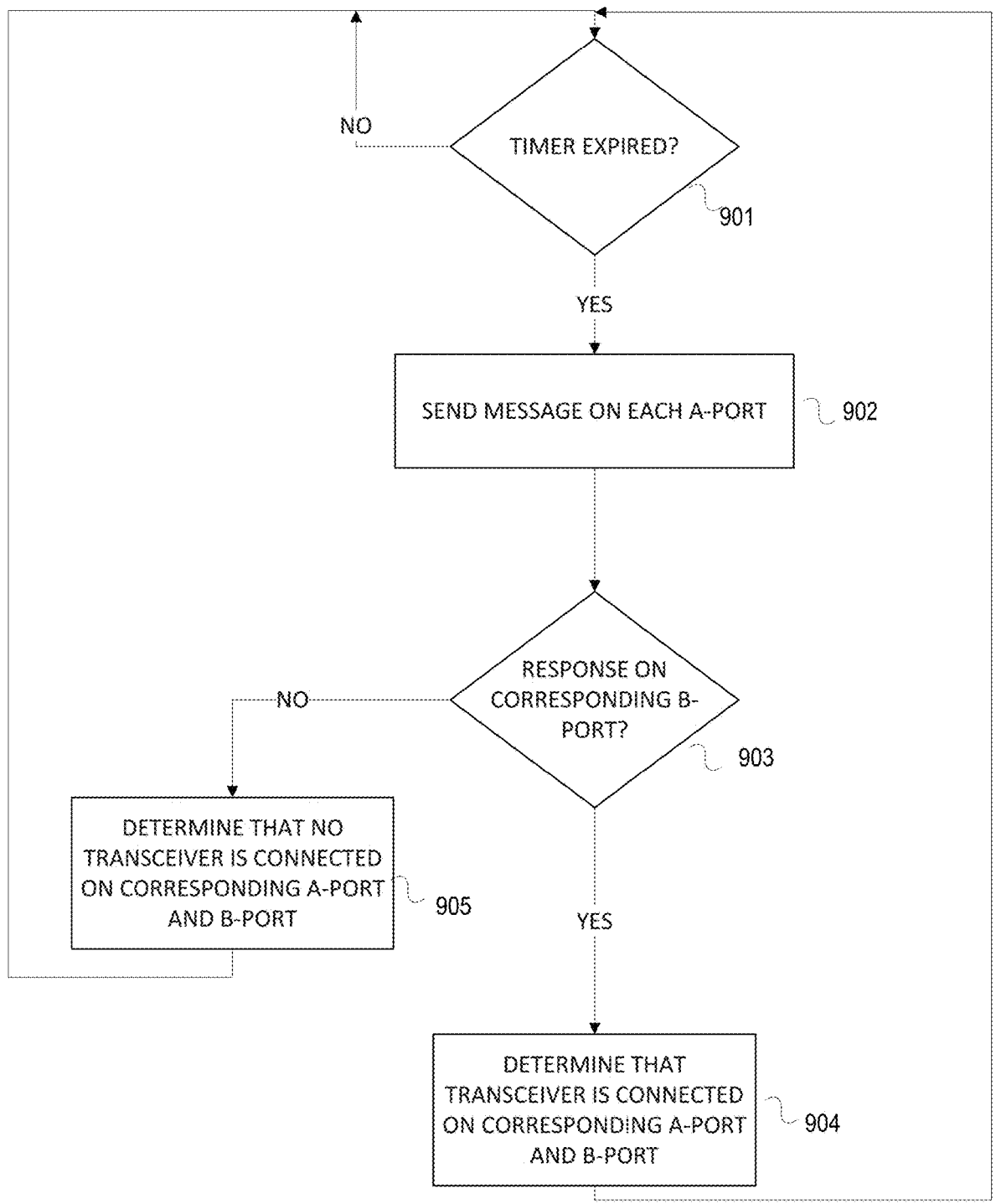
FIG. 9 shows a flowchart for a frequency manager determining whether a transceiver is connected to an A-Port and a B-Port of a frequency manager in accordance with an aspect of the embodiments.

Frequency manager controller 233 may periodically attempt to communicate with each A port 222-226 via link 261 and look for a response from corresponding B port 227-231 via link 262 as discussed in further detail with flowchart 801 (FIG. 9). If a response is obtained, then a transceiver is connected to that port. If the response stops then the transceiver must have been removed from that port.

Antenna signals to/from antenna 201 are separated or combined into two bands using multi-band 203 (diplexer filter) rather than a traditional broadband RF splitter or RF band selection switch. The resulting RF signals for each of the two frequency bands are directed through duplexers 204, 205, 212, and 213 and separate processing circuitry comprising power amplifiers (PAs) 206 and 207 and low noise amplifiers (LNAs) 208 and 209.

This approach typically reduces signal loss, thus improving receiver sensitivity, and reduces gain requirements of PAs 206 and 207. Band-specific LNAs 208 and 209 and PAs 206 and 207 are utilized for first and second frequency bands, respectively, so amplifier performance may be optimized over that of single broadband LNA or PA.

Embodiments may include attenuators 210-211 and/or 216-221 that support adjustment/calibration of the RF gain through manager 299. For example, attenuators 210-211 and 216-221 may maintain unity gain through manager 299 in both transmit and receive modes. Attenuators 216-221 may remove excess gain from LNA 208-209 and may also provide an RF load to reduce reflections from unused RF ports. Attenuators 210-211 may remove excess gain from PA 206-207, allowing for the correction of amplifier tolerances.

Prior to distribution by 8:1 splitter 215, frequency bands are combined or separated using second diplexer filter 214. Printed circuit board (PCB) based 8:1 splitter 215 may be implemented using seven 2:1 printed Wilkinson splitters optimized for port-to-port isolation at 2.4 and 5.7 GHz. Printing the splitters on the PCB offers a cost savings over lumped element splitters. The number of transceiver ports may be increased by adding more splitters or decreased by removing or terminating unused splitter sections.

Frequency manager 299 allows transmitter and receiver timing synchronization in both frequency bands simultaneously. Transceivers 251-253 may independently operate in one band or parts of both bands. Frequency manager 299 increases system channel capacity by synchronizing transmit and receive timing across all connected microphone channels.

A cascade feature allows multiple frequency managers to synchronize further increasing the systems simultaneous microphone channel capacity. For example, as will be discussed in further detail, a downstream frequency manager may be connected to cascade ports 271-272.

Figure 5:
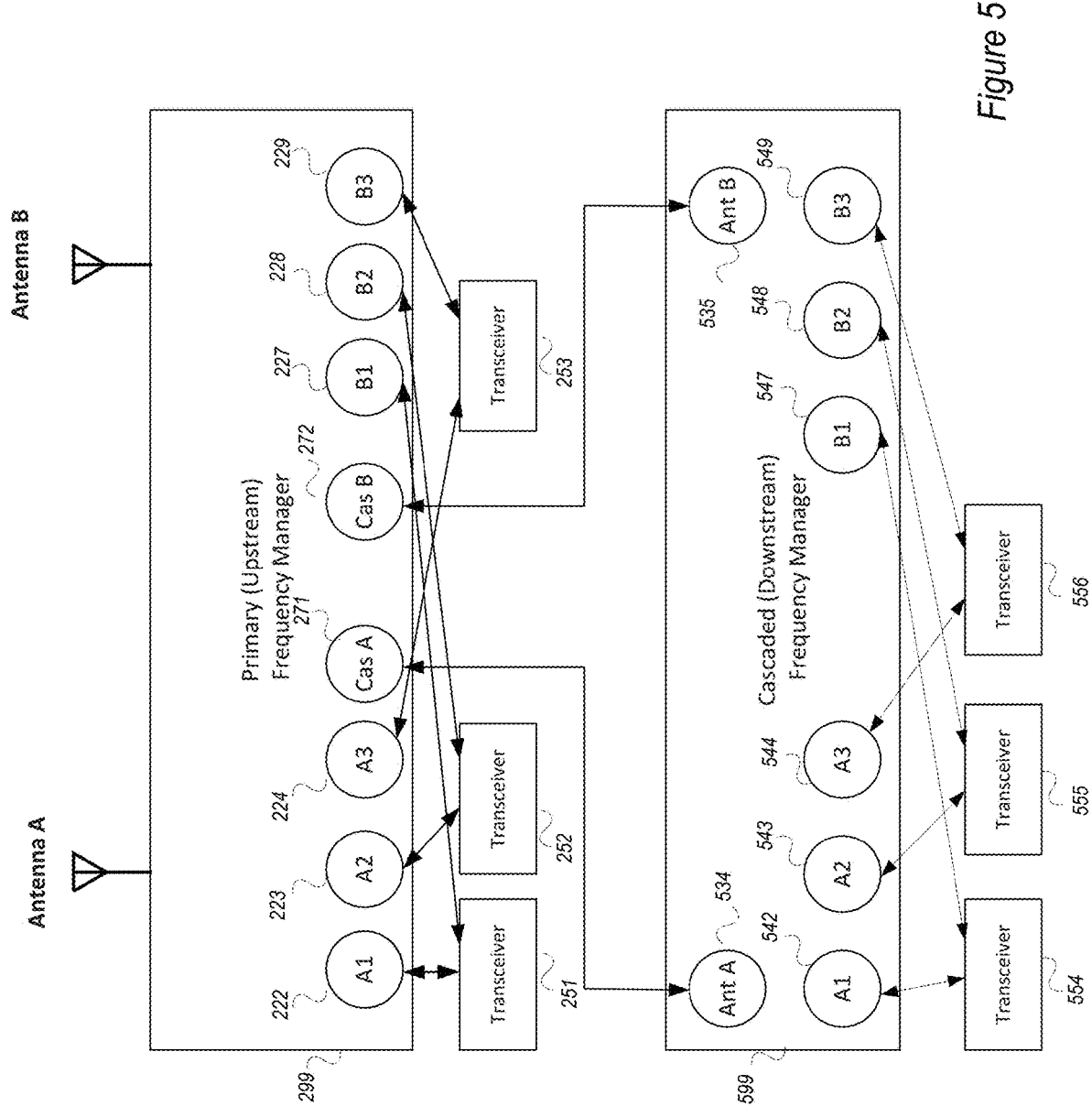
FIG. 5 shows a wireless microphone system with a primary frequency manager and a cascaded (downstream) frequency manager in accordance with an aspect of the embodiments.

Cascade detect/data links 263 and 264 enable frequency manager 299 via frequency manager controller 233 to discover whether the antenna input port is connected to an antenna or to cascade ports 271-272 of an upstream frequency manager (for example, frequency manager 299) as shown in FIG. 5. Referring to FIG. 5, if the A-antenna port 534 is connected to an antenna, there will be no response on corresponding B-antenna port 535 when the frequency manager controller of cascaded (downstream) frequency manager 599 attempts to communicate on A-antenna port 534. If the A-antenna port 534 is connected to the cascade output of upstream frequency manager 299, data will be received on B-antenna port 535.

With some embodiments, frequency manager controller 233 may send data (for example, messages) to the A-antenna port via link 263 and receive data for the B-antenna port via link 264 by modulating RF signals as discussed above.

With some embodiments, frequency manager controller 233 may send data (for example, messages) to the A-antenna port via link 263 and receive data from the A-antenna port via link 264 by modulating RF signals using a bi-directional data communication system.

Returning back to FIG. 2, frequency manager 299 may communicate through RF ports 222-231 to determine the capabilities of the transceivers 251-253 (for example, dual band transceivers or legacy 2.4 GHz transceivers or receivers). From the discovered capabilities, frequency manager 299 may select one or more transceivers 251-253 to perform frequency scanning. For example, frequency manager 299 may select a transceiver that has multi-band capabilities rather than single-band capabilities. However, other criteria may be used. As another example, frequency manager 299 may select the first detected device or may select a plurality of detected devices (for example, transceivers 251-253) to accelerate the scanning process. Moreover, frequency manager 299 may select one or more RF devices (for example, transceivers 554-556 as shown in FIG. 5) on a downstream frequency manager (for example, frequency manager 599 as shown in FIG. 5) by interacting with the downstream frequency manager via links 263 and 264.

As a result of frequency scanning, a wireless microphone system may be optimally configured for the best channels for operation. Optimization may be based on RF spectrum availability, so that higher detected RF noise or interference on a given channel results in lower deployment-prioritization for that channel.

Frequency manager 299 may determine the capabilities of wireless microphones 101-103 (as shown in FIG. 1) when pairing them with transceivers 251-253 and 554-556. For example, a legacy wireless microphone can work with a multi-band transceiver but will be limited to the 2.4 GHz band, where the transceiver can still scan on multiple bands but would limit frequency options once paired with the legacy wireless microphone.

Figure 3:
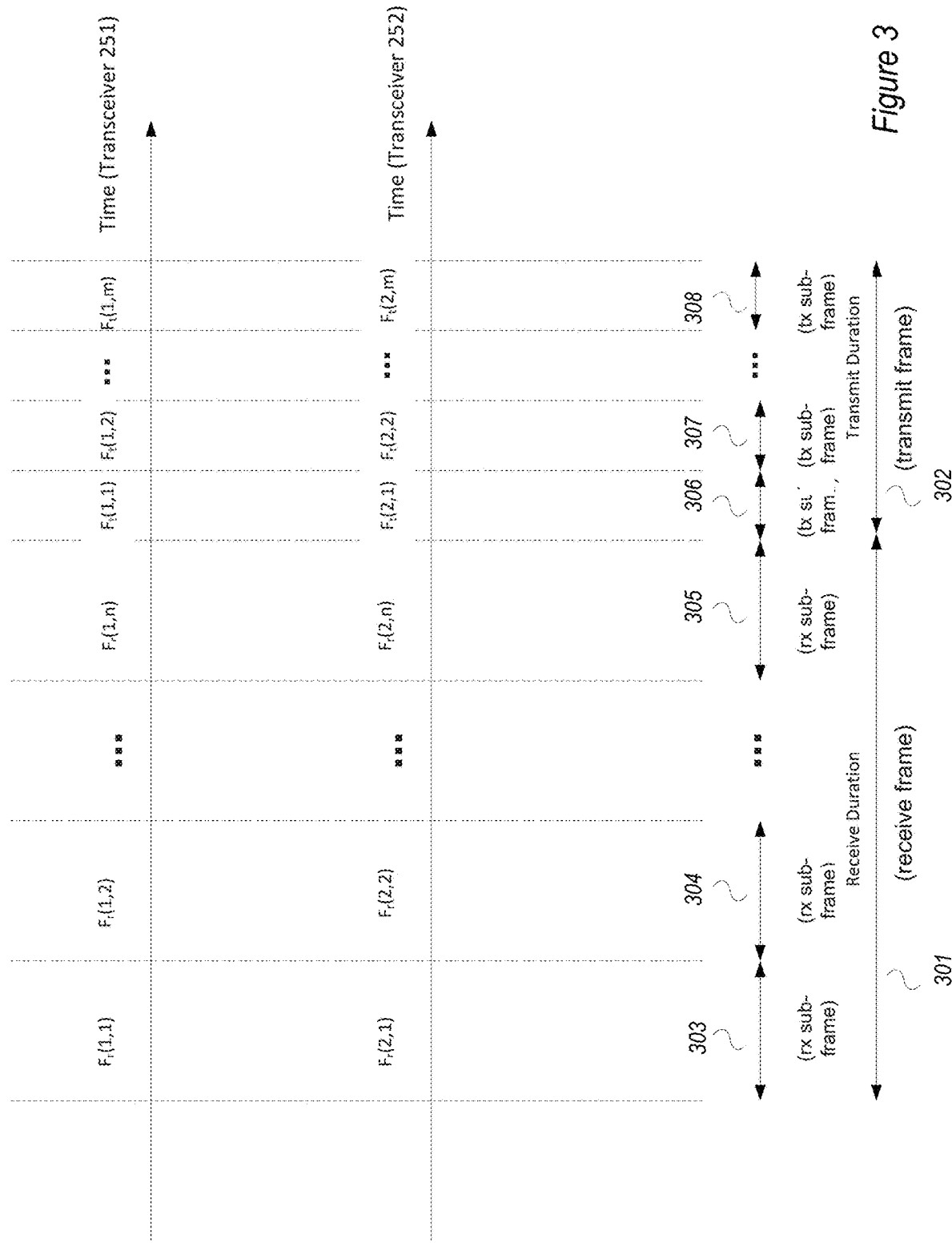
FIG. 3 shows a frequency assignment for two fixed transceivers in a wireless microphone system in accordance with an aspect of the embodiments.

FIG. 3 shows a frequency assignment for two transceivers 251 and 252 in a wireless microphone system in accordance with an aspect of the embodiments. As discussed above, transceivers 251 and 252 are synchronized together. Consequently, transceivers 251-252 are time aligned to receive frame 301 (during which transceivers 251-252 receive data from paired wireless microphones) and transmit frame 302 (during which transceivers 251-252 transmit data to paired wireless microphones).

Receive frame 301 and transmit frame 302 may be further divided into receive sub-frames 303-305 and transmit sub-frames 306-308, respectively. Because the amount of received data may differ from the amount of transmitted data, the time durations of received sub-frames 303-305 may be different from the time durations of transmitted sub-frames 306-308.

After data (typically mostly audio data) is sent from the paired wireless microphones (typically portable units) to transceivers 251-252, the paired wireless microphones enter a receive frame, in which transceivers 251-252 (often rack mounted) send data back to the wireless microphones using the same hopping frequencies and hopping sequence during transmit frame 302. Data from transceivers 251-252 may include parameters such as hopping frequency, hopping sequence, and hopping timing information.

During each receive sub-frame 303-305, transceivers 251-252 receive at an assigned frequency $F_r(1,i)$ and $F_r(2,i)$, respectively, where i denotes the $i^{th}$ receive sub-frame and where parameter n may or may not be equal to parameter m. Similarly during each transmit sub-frame 306-308, transceivers 251-252 transmit at an assigned frequency $F_r(1,i)$ and $F_r(2,i)$, respectively, where i denotes the $i^{th}$ transmit sub-frame.

Transceivers 251 and 252 may or may not transmit or receive on the same frequency band at the same time. For example, $F_r(1,1)$ and $F_r(2,1)$ may be in a first frequency band. As another example, $F_r(1,1)$ and $F_r(2,1)$ may be in the first frequency band and a second frequency band, respectively.

Also, transceivers 251 and 252 may or may not transition from one frequency band to another frequency band. For example, both $F_r(1,1)$ and $F_r(1,2)$ may be in a first frequency band. As another example, $F_r(1,1)$ and $F_r(1,2)$ may be in the first frequency band and a second frequency band, respectively.

With some embodiments, transceivers may use the same frequencies for transmitting as for receiving. For example, $F_r(1,1)$ and $F_r(1,1)$ may be the same or may be different.

Figure 4:
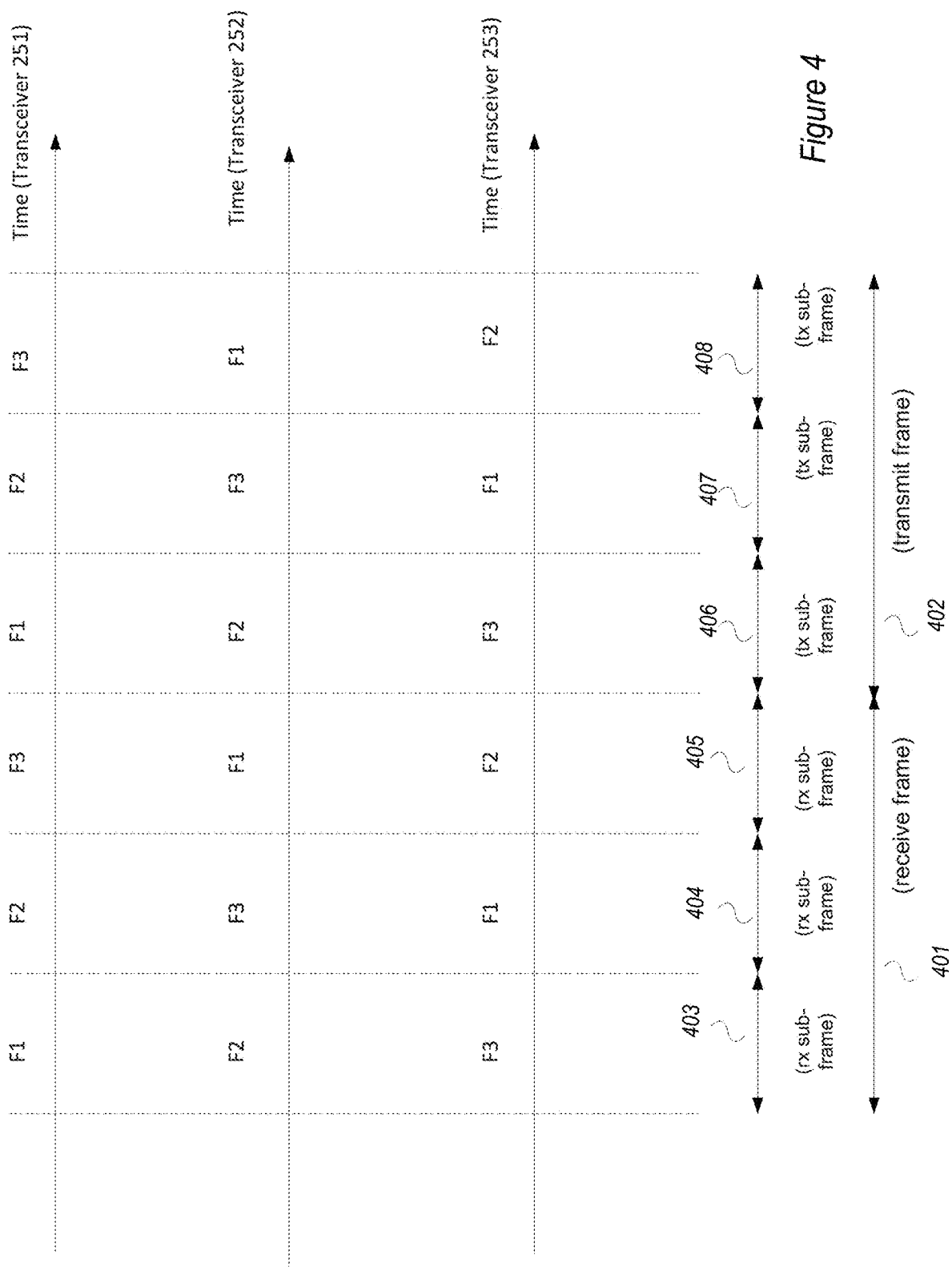
FIG. 4 shows a frequency assignment utilizing frequency hopping in accordance with an aspect of the embodiments.

FIG. 4 shows a specific frequency assignment based on FIG. 3 that utilizes frequency hopping in accordance with an aspect of the embodiments. During receive frame 401, transceivers 251-253 receive at F1, F2, and F3, at F2, F3, and F1, and at F3, F1, F2, respectively, during receive sub-frames 403-405, respectively. Because transceivers 251-253 share the same frequency group, the capacity is approximately three times greater than if transceivers 251-253 were assigned three different frequency groups. Extending this approach, another group of three frequencies F4, F5, F6 may be shared by three other transceivers (for example, transceivers 554-556 as shown in FIG. 5).

Frequency hopping often provides greater robustness to signal interference. For example, if F1 were exposed to an interfering RF signal, F2 and F3 may not.

F1, F2, and F3 may be in the same frequency band or different frequency bands. In the latter case, F1, F2, and F3 may be in a first frequency band (for example, 2.4 GHz), second frequency band (for example, 5.5 GHz) and third frequency band (for example, 1.8 GHz), respectively.

After receive frame 401, transceivers 251-253 transmit at F1, F2, and F3, at F2, F3, and F1, and at F3, F1, F2, respectively, during transmit sub-frames 406-408, respectively.

While FIG. 4 depicts a single frequency hopping sequence occurring during receive frame 401 or transmit frame 402, a plurality of frequency hopping sequences may occur (for example, F1, F2, F3, F1, F2, F3).

FIG. 5 shows a wireless microphone system with primary frequency manager 299 and cascaded (downstream) frequency manager 599 in accordance with an aspect of the embodiments. Cascading frequency managers is one approach for increasing the capacity of a wireless microphone system. With respect to FIG. 2, transceivers 554-556 are added to the wireless microphone system by connecting transceivers 554-556 to A-ports 542-544 and B-ports 547-549, respectively, of cascaded frequency manager 599.

Cascaded frequency manager 599 is cascaded with primary frequency manager 299 by connecting antenna ports 534-535 to cascade ports 271-272, respectively. As discussed above, cascaded frequency manager 599 determines that an upstream frequency manager is connected to cascaded frequency manager 599 when it receives a response via antenna port 535 in response to sending data (for example, a query message) via antenna port 534.

While not explicitly shown in FIG. 5, each frequency manager may support a separate frequency manager controller (for example, frequency manager controller 233 as shown in FIG. 2). When frequency managers 299 and 599 are cascaded, the associated frequency manager controllers may interact to share information (for example, scanner information) and to coordinate frequency assignments. With some embodiments, frequency manager controller 233 may serve as a master controller by instructing frequency manager 599 to assign a particular frequency group and frequency hopping sequence to transceivers 554-556.

A wireless microphone system may utilize more than one transceiver (for example, transceiver 251 and transceiver 554) to serve as scanning devices that span both frequency managers 299 and 599.

Figure 6:
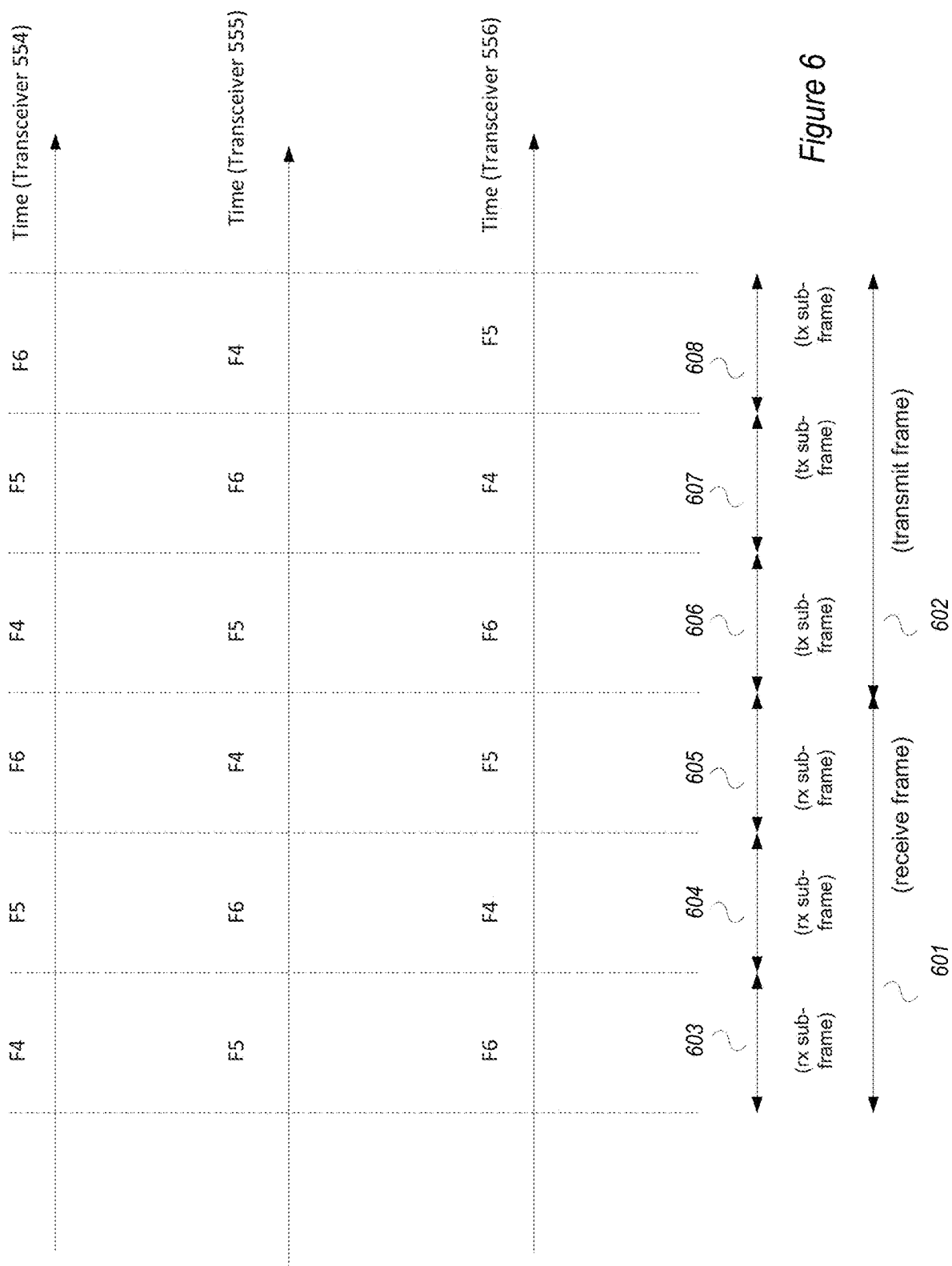
FIG. 6 shows a frequency assignment for transceivers connected to a downstream frequency manager in accordance with an aspect of the embodiments.

FIG. 6 shows a frequency assignment for transceivers 554-556 (as shown in FIG. 5) in a wireless microphone system in accordance with an aspect of the embodiments. With some embodiments, frequency manager 599 interacts with frequency manager 299 to insure that the frequency assignments for transceivers 554-556 do not conflict with the frequency assignments for transceivers 251-253.

During receive frame 601, transceivers 554-556 receive at F4, F5, and F6, at F5, F6, and F4, and at F6, F4, and F5, respectively, during receive sub-frames 603-605, respectively. F4, F5, and F6 may be in the same frequency band or different frequency bands. In the latter case, F4, F5, and F6 may be in a first frequency band (for example, 2.4 GHz), second frequency band (for example, 5.5 GHz), and a third frequency band (for example, 1.8 GHz), respectively.

During transmit frame 602, transceivers 554-556 transmit at F4, F5, and F6, at F5, F6, and F4, and at F6, F4, F5, respectively, during transmit sub-frames 606-608, respectively.

Embodiments may support frequency assignments in which transceivers 251 and 252 (and the paired wireless microphones) operate in different frequency bands. For example, all of the hopping frequencies assigned to transceiver 251 are in a first frequency band while all of the hopping frequencies assigned to transceiver 252 are in a second frequency band.

Embodiments may support frequency assignments in which primary frequency manager 229 share frequencies with transceivers connected to downstream frequency manager 599 using different frequency hopping sequences.

Figure 7:
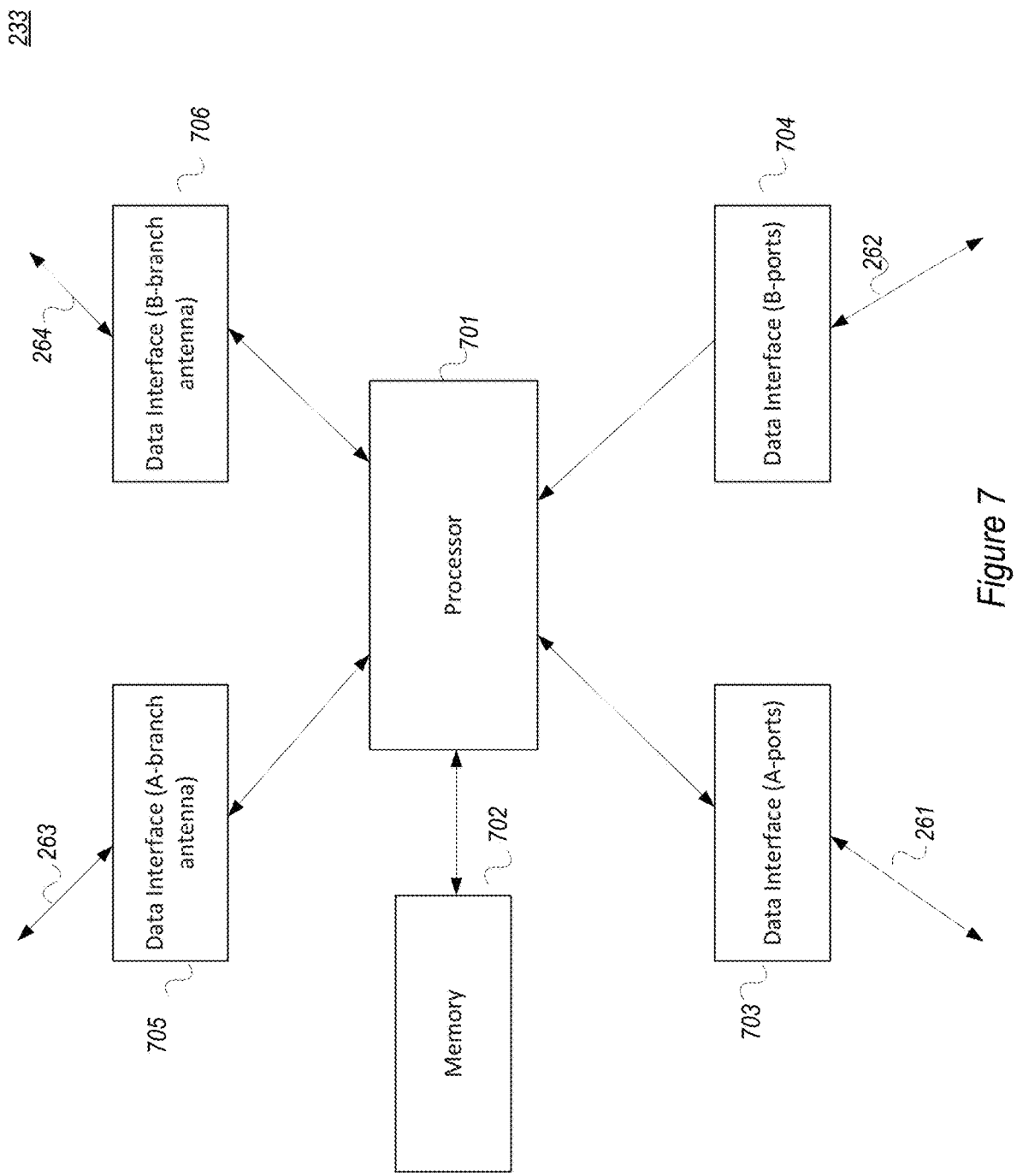
FIG. 7 shows a frequency manager controller in accordance with an aspect of the embodiments.

FIG. 7 shows frequency manager controller 233 in accordance with an aspect of the embodiments. Frequency manager controller 233 comprises processor 701, memory device 702, and data interfaces 703-706.

Figure 8:
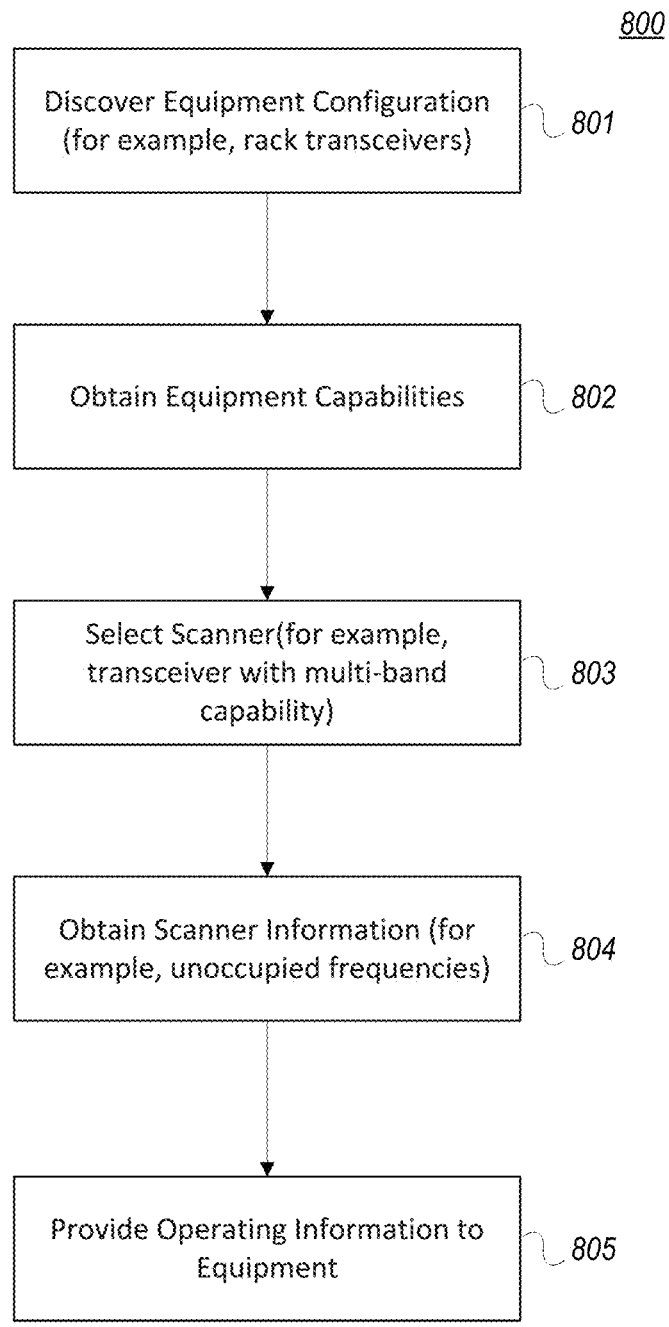
FIG. 8 shows a flowchart for a frequency manager supporting frequency assignments of fixed transceivers in accordance with an aspect of the embodiments.
Figure 10:
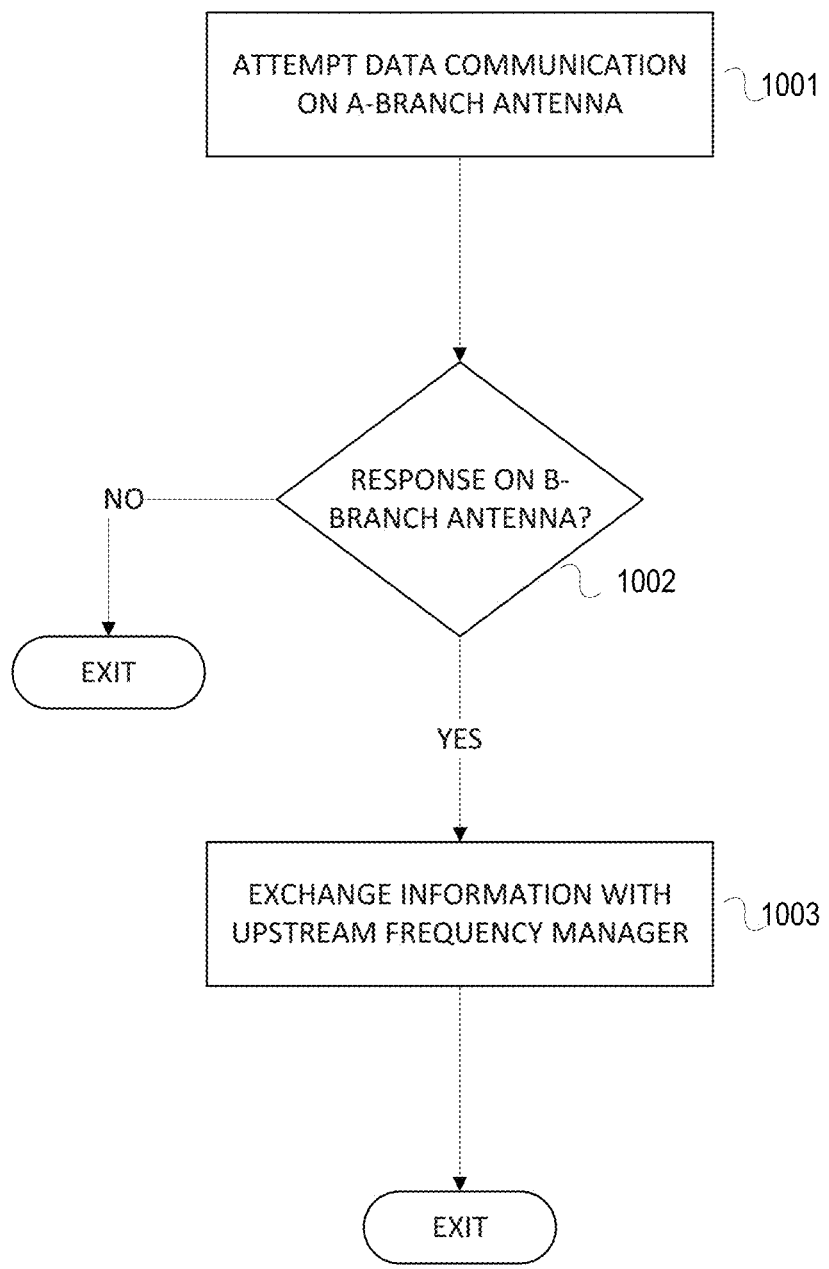
FIG. 10 shows a flowchart for a frequency manager determining whether it is connected to an antenna or to an upstream frequency manager in accordance with an aspect of the embodiments.

Processor 701 may execute computer executable instructions from a computer-readable medium, such as memory device 702, in order perform processes 800, 801, and 1000 corresponding to FIGS. 8-10, respectively.

Frequency manager controller 233 may include one or more application-specific integrated circuits (ASICs), complex programmable logic devices (CPLDs), field-programmable gate arrays (FPGAs), or other integrated circuits. Computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 701. The executable instructions may carry out any or all of the method steps described herein. With some embodiments, frequency manager controller 233 (for example, a laptop computer) may be external to the RF components of frequency manager 299.

Processor 701 exchanges data with A-ports 222-226, B-ports 227-231, A-antenna port 237, and B-antenna port 236 via data interfaces 703-706, respectively. For example, when processor 701 wishes to send data (for example, a data message containing an assigned frequency group and frequency hopping sequence) to transceiver 252 (as shown in FIG. 2), processor 701 provides the data on data link 261 and configures multiplexer 234 to direct the data to A-port 223.

FIGS. 8-10 present flowcharts 800, 801, and 1000, respectively, that may be performed by processor 701 when executing computer-readable instructions stored at memory device 702.

FIG. 8 shows flowchart 800 for frequency manager 299 or 599 supporting frequency assignments of transceivers 251-253 and 554-556 in accordance with an aspect of the embodiments.

At block 801, frequency manager controller 233 sends query message to each A-port 222-226. If a response message is received from a corresponding B-port 227-231, frequency manager controller 233 determines that an RF device (for example, transceiver 251) is connected to the corresponding A-port and B-port.

Frequency manager controller 233 may then obtain information about the RF device's capabilities at block 802. Based on obtained capability information, frequency manager controller 233 selects one or more transceivers to serve a frequency scanner at block 803. Frequency manager controller 233 may base the selection based on one or more criterion such as multiple frequency band capability and the like.

At block 804, frequency manager controller 233 obtains scanner information about unoccupied frequencies and assigns those frequencies to the connected transceivers at block 805. In addition, frequency manager controller 233 may provide a frequency hopping sequence and frequency hopping timing information to each connected transceiver. A connected transceiver may subsequently provide configuration information to a paired wireless microphone based on provided configuration information as described above.

With embodiments of the disclosure, frequency manager controller 233 may periodically obtain updated scanner information and possibly provide frequency reassignments to the connected transceivers. In addition, frequency manager controller 233 may obtain updated scanner information when equipment is added or removed from the wireless microphone system. For example, a transceiver may be added that introduces a new frequency band to the wireless microphone system.

FIG. 9 shows flowchart 801 for frequency manager 299 or 599 determining whether a fixed transceiver 251-253 or 554-556 is connected to an A-port 222-224 or 542-544 and a B-port 227-229 or 547-549 of frequency manager 299 or 599 in accordance with an aspect of the embodiments.

At block 901, frequency manager controller 233 periodically determines whether to query the A-ports and B-ports to determine whether an RF device is connected. When a timer expires (for example, every 132 milliseconds), frequency manager controller 233 sends a query message to each A-port at block 902.

Frequency manager controller 233 determines whether a response is received at the corresponding B-port at block 903. For example, when frequency manager controller 233 sends a query message on A-port 223 (as shown in FIG. 2), frequency manager controller 233 determines whether a response is received on B-port 228.

If frequency manager controller 233 receives a response, frequency manager controller 233 determines that an RF device is connected to the corresponding A-port and B-port at block 904. Otherwise, after several missed responses, frequency manager controller 233 determines that no RF device is connected at block 905.

Because process 801 is periodically executed, frequency manager controller 233 is able to determine when an RF device is connected or disconnected from a wireless microphone system.

FIG. 10 shows flowchart 1000 for frequency manager 299 or 599 determining whether it is connected to antenna or to an upstream frequency manager in accordance with an aspect of the embodiments.

At block 1001, frequency manager controller 233 attempts to communicate on the A-antenna port. At block 1002, frequency manager controller 233 determines whether a response is received on the B-antenna port. If so (which would be the case if frequency manager controller 233 were located at frequency manager 599 as shown in FIG. 5), frequency manager controller 233 would exchange information (for example, configuration information) with the upstream frequency manager (for example, frequency manager 299) at block 1003.

FIGS. 11-14 show additional embodiments of a frequency manager supporting two frequency bands, which have similar features and functionality as the example described in relation to FIG. 2.

Figure 11:
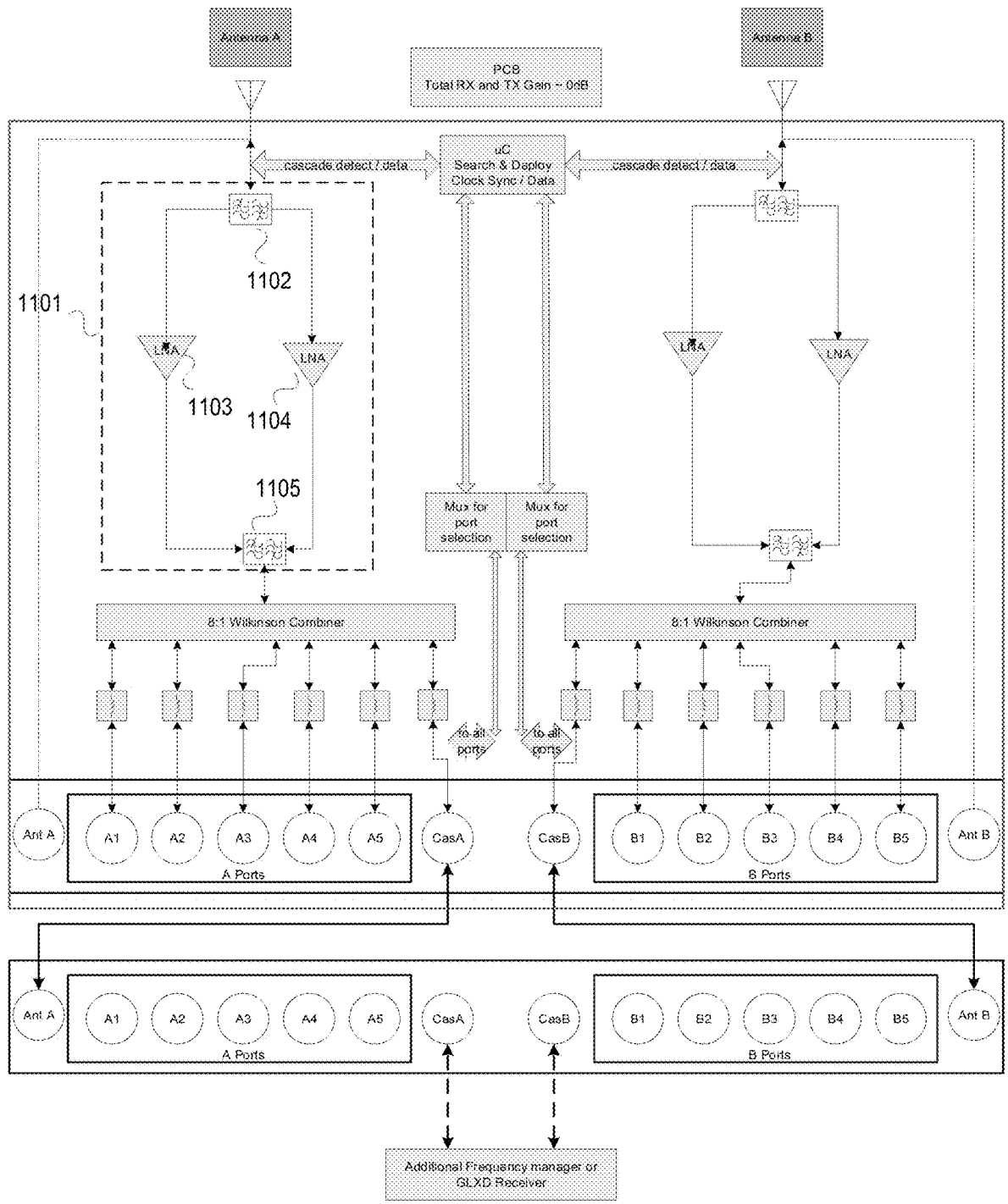
FIGS. 11-14 show embodiments of a frequency manager supporting two frequency bands.

Referring to FIG. 11, frequency manager 1100 comprises RF processing circuitry 1101 that supports a uni-directional connection from multi-band filter 1102 to multi-band 1105. Consequently, frequency manager 1100 supports radios comprising only receivers that receive an RF signal from one or more wireless microphones.

LNA's 1103 and 1104 process received RF signals in first and second frequency bands, respectively.

Figure 12:
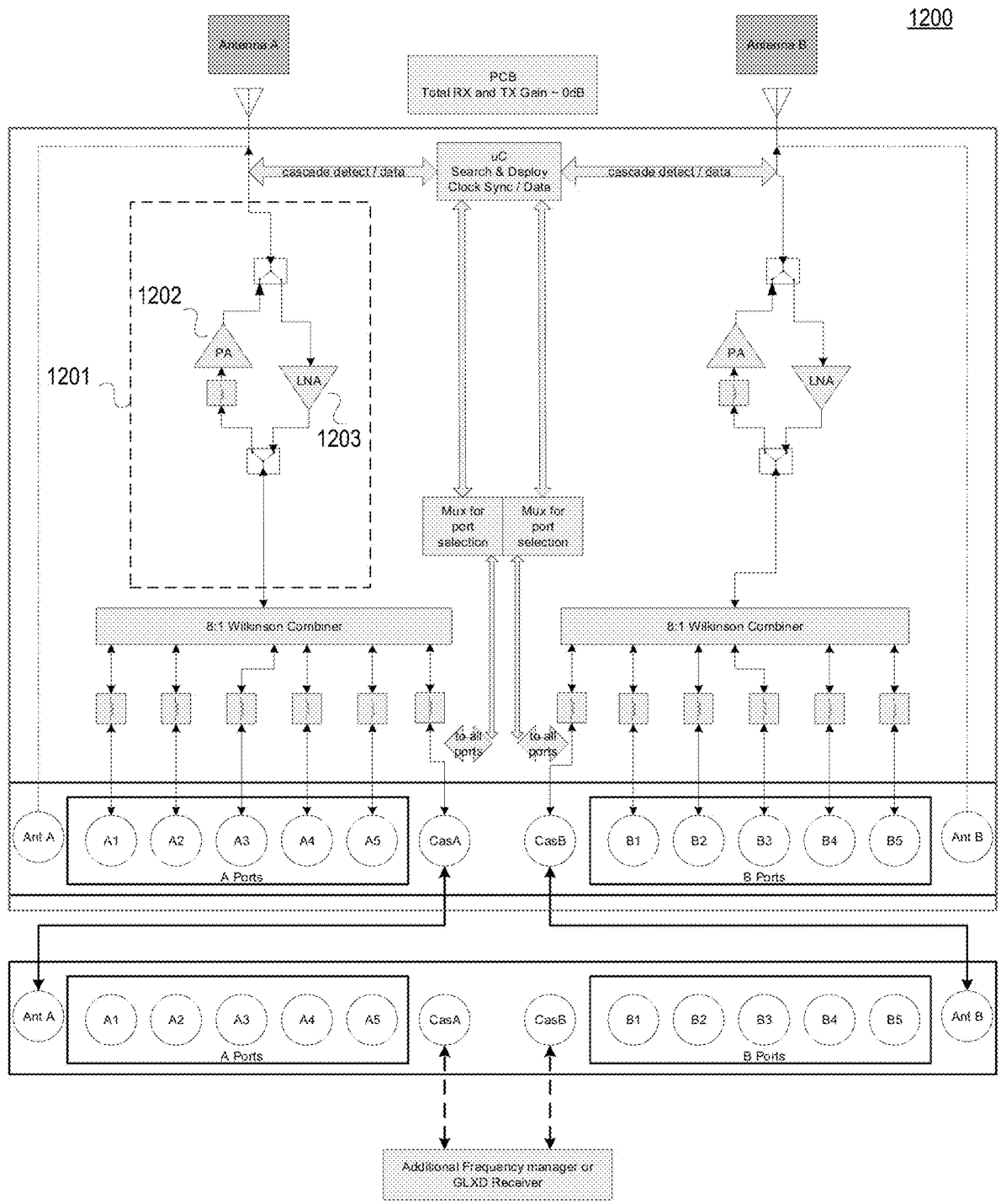

Referring to FIG. 12, frequency manager 1200 comprises RF processing circuitry 1201 that support a bi-directional connection with wideband PA 1202 and wideband LNA 1203. Consequently, multi-band filters are not incorporated into RF processing circuitry 1201.

The received RF signal processed by LNA 1203 may include supported RF components generated by the supported microphone in the first and second frequency bands as well as unsupported RF components generated by other unsupported sources between the first and second frequency bands. LNA 1203 may remove the unsupported RF components so that only the supported RF components are presented to connected transceivers.

Figure 13:
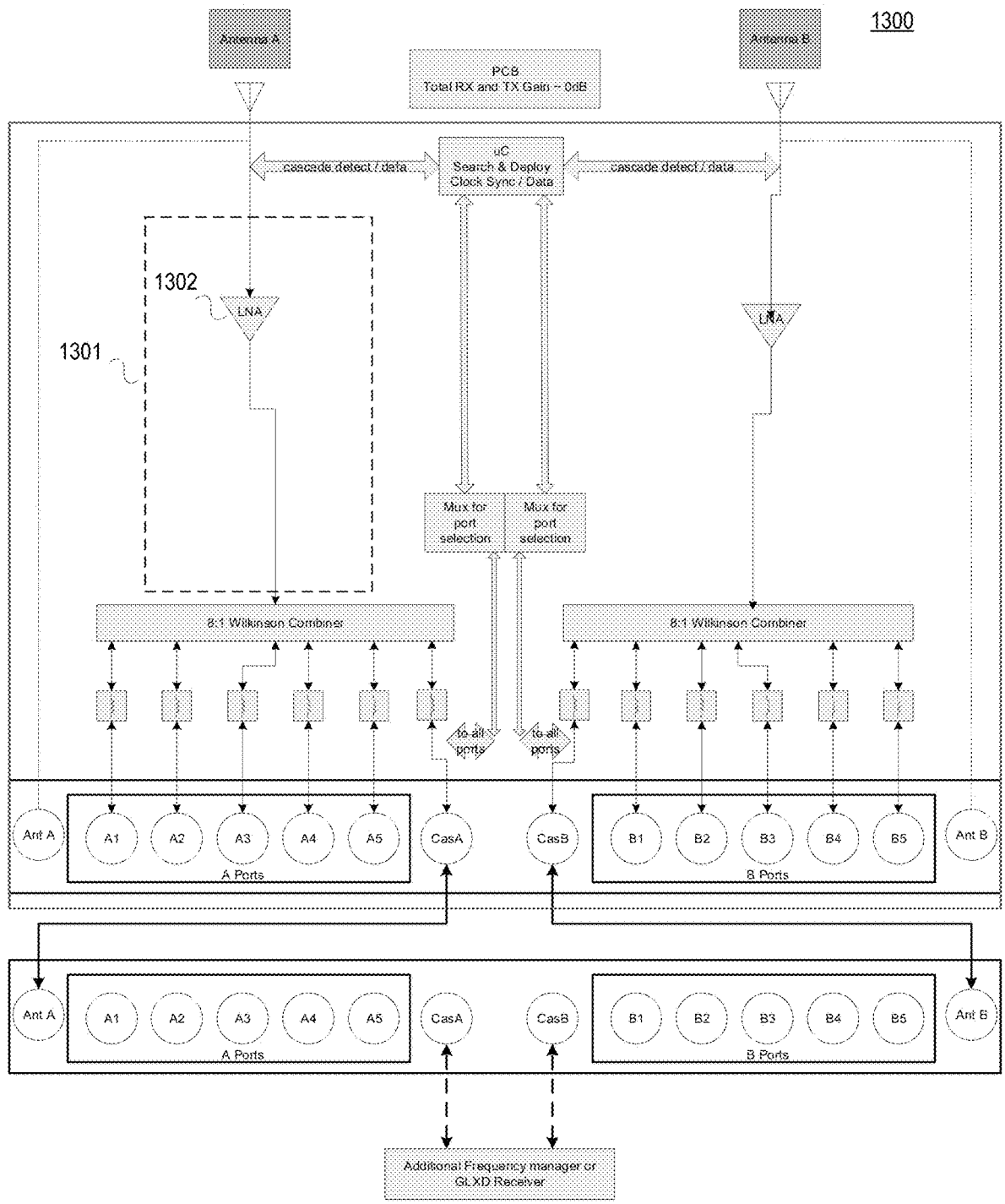

Referring to FIG. 13, frequency manager 1300 supports a uni-directional connection so that only receivers are supported. Consequently, RF processing circuitry 1301 includes LNA 1302 but not a corresponding PA.

Figure 14:
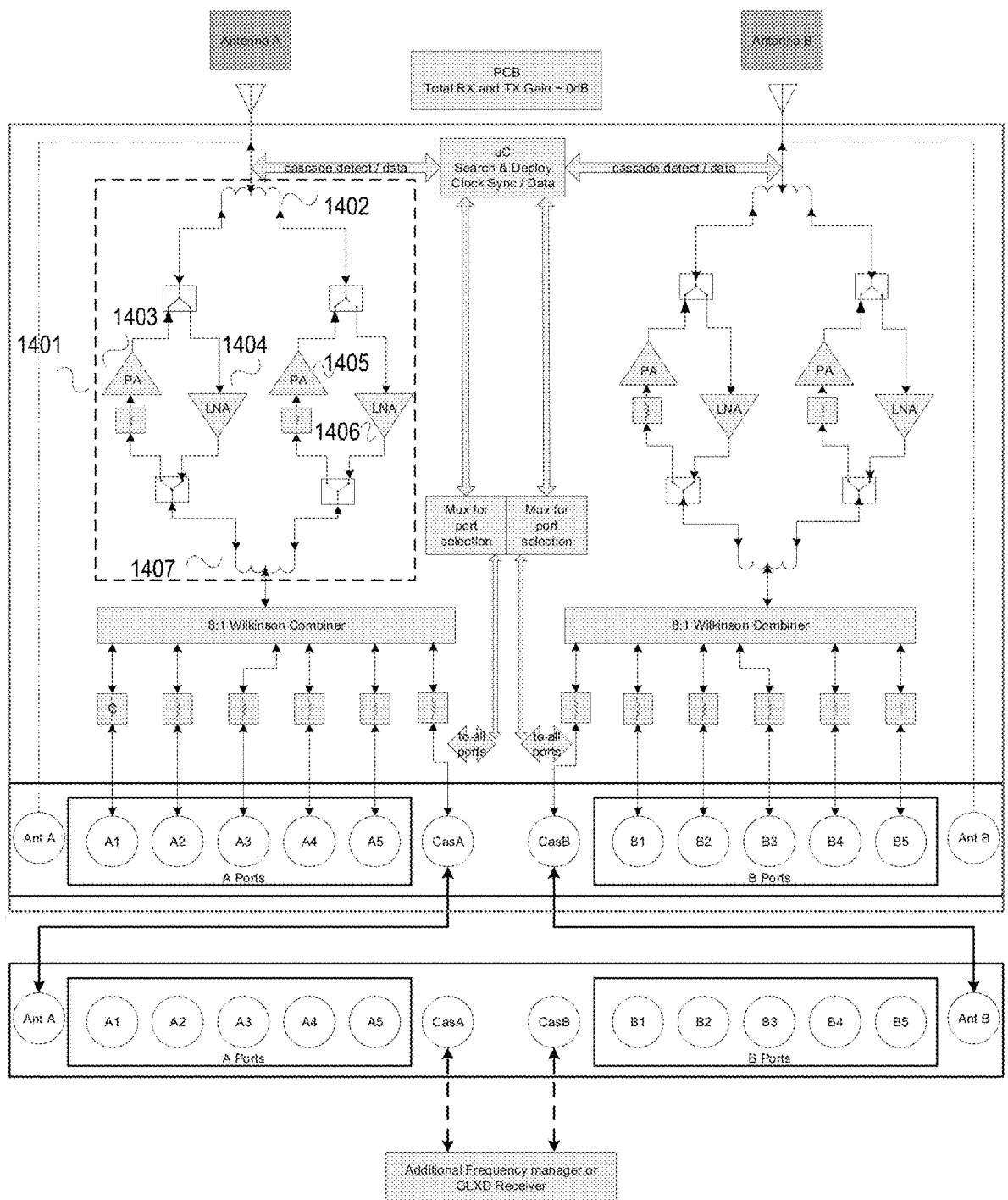

Referring to FIG. 14, frequency manager 1400 supports a bi-directional connection as with frequency manager 299 as shown in FIG. 2. However, RF processing circuitry 1401 utilizes RF splitters 1402 and 1403 as well as appropriate filtering by PA's 1403 and 1405 and LNA's 1404 and 1406 to circumvent the need for multi-band filters.

Figure 15:
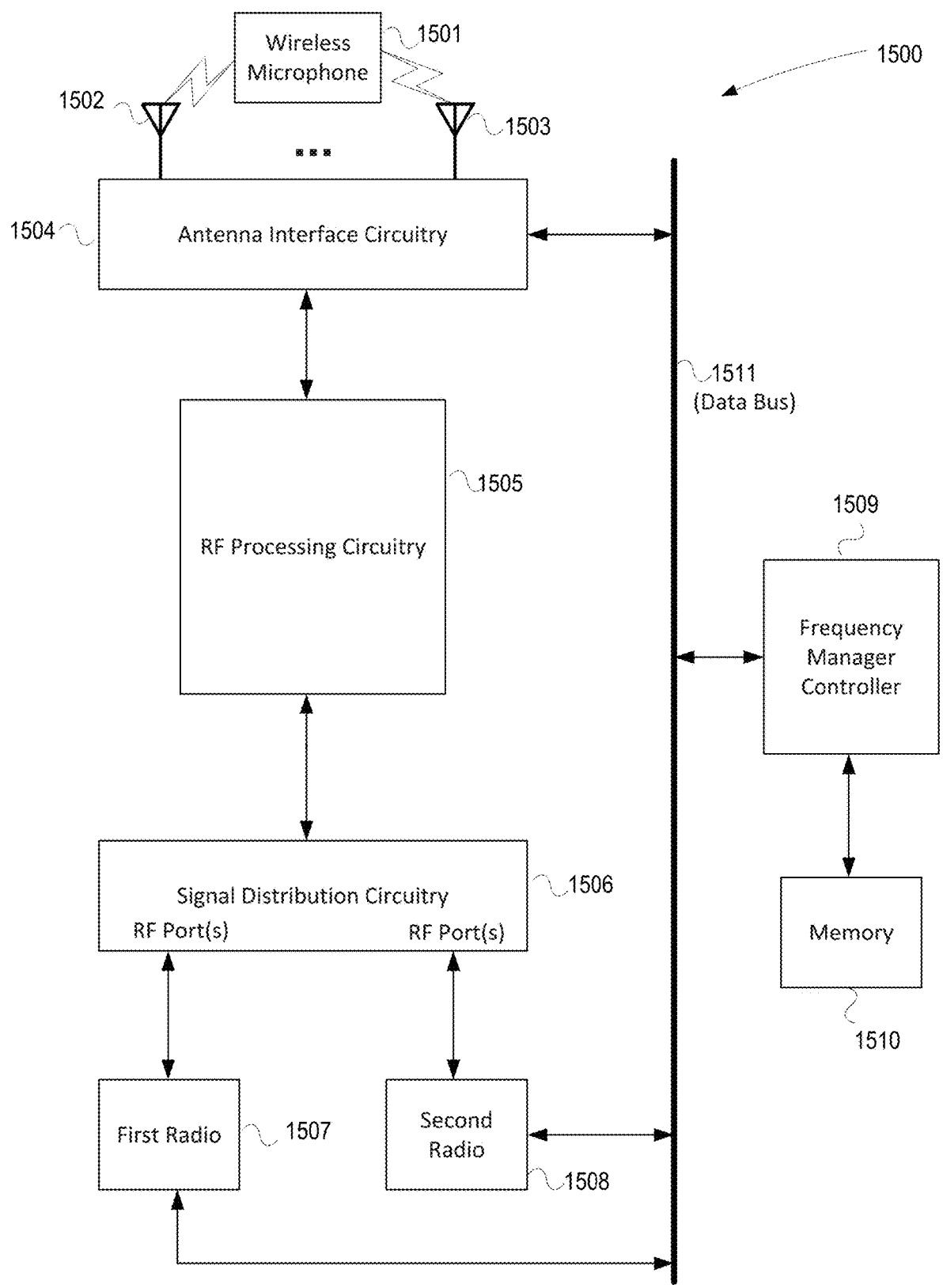
FIG. 15 shows an apparatus that may support the embodiments shown in FIGS. 2 and 11-14.

FIG. 15 shows apparatus 1500 that may support the embodiments shown in FIGS. 2 and 11-14.

Wireless microphone 1501 communicates with apparatus 1500 via antennas 1502 and 1503 through antenna interface circuitry 1504. Apparatus 1500 supports two antennas to provide antenna diversity, where received signals through antennas 1502 and 1503 may be combined by antenna interface circuitry 1504. However, embodiments may support one, two, or more than two antennas for reception and/or transmission.

Apparatus 1500 may support a bi-directional or uni-directional communications between wireless microphone 1501 and apparatus 1500.

Both transmitted and received RF signals are processed by RF processing circuitry 1505 as previously discussed with the embodiments shown in FIGS. 2 and 11-14. Received processed signals are distributed to radios 1507-1508 from signal distribution circuitry 1506 while processing transmitted signals from radios 1507-1508. For example, signal distribution circuitry 1506 corresponds to Wilkinson combiner 215 as shown in FIG. 2.

Frequency manager controller 1509 sends and receives data from different elements of apparatus 1500 via data bus 1511. While FIG. 1500 shows data bus 1511 as a dedicated pathway, data bus 1511 may utilize one or more shared pathways, for example, the RF pathway to/from radios 1507-1508 via RF ports as previously discussed. Frequency manager controller 1509 may also obtain antenna configuration status information from antenna interface circuitry 1504 via data bus 1511. For example, as previously discussed, frequency manager controller 1509 may determine whether an upstream frequency manager is connected via the antenna ports.

Various aspects described herein may be embodied as a method, an apparatus, or as computer-executable instructions stored on one or more non-transitory and/or tangible computer-readable media. For example, referring to FIG. 15, frequency manager controller 1509 may obtain computer-execution instructions from memory device 1510. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (for example, air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

Exemplary Clauses

1. An apparatus for managing a frequency spectrum to a plurality of transceivers paired with a plurality of wireless microphones, wherein the plurality of wireless microphones comprises first and second microphones, the apparatus comprising:
- a first multi-band filter bi-directionally connected to a first antenna and configured to receive a received radio frequency (RF) signal and to transmit a transmitted RF signal simultaneously on a plurality of frequency bands, wherein the plurality of frequency bands comprises at least a first frequency band and a second frequency band, wherein the first and second frequency bands are different, wherein the received RF signal comprises first and second received components received from the first and second wireless microphones, respectively, and wherein the transmitted RF signal comprises first and second transmitted components transmitted to the first and second wireless microphones, respectively;
- a second multi-band filter;
- a first processing circuit electrically bi-directionally connected between the first and second multi-band filters and configured to electrically process the received and transmitted RF signals only for the first frequency band;
- a second processing circuit electrically bi-directionally connected between the first and second multi-band filters and configured to electrically process the received and transmitted RF signals only for the second frequency band; and
- an RF splitter/combiner bi-directionally connected to the second multi-band filter, configured to combine the first and second transmitted components from first and second transceivers, respectively, into the transmitted RF signal, to split the received RF signal into first and second received RF portions, respectively, and to direct the first and second received RF portions to the first and second transceivers, respectively, wherein the first transceiver is operating at the first frequency band while the second transceiver is operating at the second frequency band during a time duration of the received and transmitted RF signals, and wherein the first and second transceivers extract the first and second received components from the first and second received RF portions, respectively.

2. The apparatus of clause 1 comprising:
- first and second A-ports configured to be connected to the first and second transceivers, respectively, and associated with the first antenna;
- first and second B-ports configured to be connected to the first and second transceivers, respectively, and associated with a second antenna;
- a frequency manager controller, the frequency manager controller further comprising:
  - a processor; and
  - a memory device storing computer-executable instructions that, when executed by the processor, cause the frequency manager controller to:
    - when the first transceiver is bi-directionally connected to the first A-port and the first B-port, assign the first transceiver to process the received RF signal at the first frequency band during a first receive sub-frame; and
    - when the second transceiver is bi-directionally connected to the second A-port and the second B-port, assign the second transceiver to process the received RF signal at the second frequency band during the first receive sub-frame.

3. The apparatus of clause 2, wherein the memory device storing computer-executable instructions that, when executed by the processor, cause the frequency manager controller to:
- when the first transceiver is bi-directionally connected to the first A-port and the first B-port, assign the first transceiver to process the received RF signal at a third frequency band during a second receive sub-frame, wherein the first and third frequency bands are different.

4. The apparatus of clause 2, wherein the memory device storing computer-executable instructions that, when executed by the processor, cause the frequency manager controller to:
- periodically attempt to communicate with the first transceiver via the first A-port; and
- when a response is received via the first B-port, determine that the first transceiver is connected to the first A-port and the first B-port.

5. The apparatus of clause 4, wherein the memory device storing computer-executable instructions that, when executed by the processor, cause the frequency manager controller to:
- when a response is not received via the first B-port, determine that the first transceiver is disconnected from the first A-port and the first B-port.

6. The apparatus of clause 2, wherein the memory device storing computer-executable instructions that, when executed by the processor, cause the frequency manager controller to:
- attempt to communicate to a first antenna port associated with the first antenna;
- when a response is received over a second antenna port associated with the second antenna, interact with an upstream frequency manager.

7. The apparatus of clause 2, wherein the memory device storing computer-executable instructions that, when executed by the processor, cause the frequency manager controller to:
- assign a first frequency group to the first transceiver, wherein the first frequency group comprises a first frequency in the first frequency band, a second frequency in the second frequency band, and third frequency; and
- assign a first frequency hopping sequence to the first transceiver, wherein the first transceiver sequences from the first frequency to the second frequency.

8. The apparatus of clause 7, wherein the memory device storing computer-executable instructions that, when executed by the processor, cause the frequency manager controller to:
- assign the first frequency group to the second transceiver; and
- assign a second frequency hopping sequence to the second transceiver, wherein the second transceiver sequences the same frequencies as the first frequency group but the sequence of frequencies does not overlap any of the frequencies in the first frequency hopping sequence.

9. The apparatus of clause 8, wherein the third frequency is in a third frequency band.

10. The apparatus of clause 7, further comprising a downstream frequency manager bi-directionally connected to third and fourth transceivers, wherein the memory device storing computer-executable instructions that, when executed by the processor, cause the frequency manager controller, in conjunction with the downstream frequency manager to:
assign a second frequency group to the third and fourth transceivers, wherein the second frequency group comprises fourth, fifth, and sixth frequencies different from the first, second, third frequencies;
assign a third frequency hopping sequence to the third transceiver, wherein the third transceiver sequences from the fourth frequency to the fifth frequency; and
assign a fourth frequency hopping sequence to the fourth transceiver, wherein the fourth transceiver sequences the same frequencies as the second frequency group but the sequence of frequencies does not overlap with any of the frequencies in the third frequency hopping sequence.

11. The apparatus of clause 2, wherein the memory device storing computer-executable instructions that, when executed by the processor, cause the frequency manager controller to:
determine capabilities of connected transceivers; and
select one of the connected transceivers to serve as a frequency scanner based on the determined capabilities.

12. The apparatus of clause 11, wherein the memory device storing computer-executable instructions that, when executed by the processor, cause the frequency manager controller to:
determine a set of unoccupied frequencies spanning the first and second frequency bands; and
assign a subset of the set of unoccupied frequencies to the first transceiver.

13. The apparatus of clause 11, wherein the frequency scanner is connected to a downstream frequency manager.

14. The apparatus of clause 2, wherein the memory device storing computer-executable instructions that, when executed by the processor, cause the frequency manager controller to:
when the first transceiver is bi-directionally connected to the first A-port and the first B-port, assign the first transceiver to process the received RF signal at the first frequency band during a second receive sub-frame; and
when the second transceiver is bi-directionally connected the second A-port and the second B-port, assign the second transceiver to process the received RF signal at the second frequency band during the second receive sub-frame.

15. The apparatus of clause 2, wherein the memory device storing computer-executable instructions that, when executed by the processor, cause the frequency manager controller to:
when a fifth transceiver is bi-directionally connected to the apparatus, assign the fifth transceiver to process the received RF signal at a third frequency band during the first receive sub-frame.

16. The apparatus of clause 6, wherein the memory device storing computer-executable instructions that, when executed by the processor, cause the frequency manager controller to:
when no response is received over the second antenna port associated with the second antenna, determine that the first and second ports are directly connected to the first and second antennas, respectively.

17. The apparatus of clause 7, further comprising a downstream frequency manager bi-directionally connected to a sixth transceiver, wherein the memory device storing computer-executable instructions that, when executed by the processor, cause the frequency manager controller, in conjunction with the downstream frequency manager to:
assign the first frequency group to the sixth transceiver; and
assign another frequency hopping sequence to the sixth transceiver, wherein the sixth transceiver sequences the same frequencies as the first frequency group but the sequence of frequencies does not overlap any of the frequencies in the first frequency hopping sequence.

18. The apparatus of clause 1, wherein the first frequency band is centered around one of 2.4 GHz, 5.5 GHz, 1.8 GHz, and 902 MHz.

19. A method for supporting communication with a plurality of wireless microphones, the plurality of wireless microphones comprising first and second wireless microphones, the method comprising:
pairing the first and second wireless microphones with first and second transceivers;
receiving, from a first antenna through a multi-band filter, a received radio frequency (RF) signal from the first and second wireless microphones, wherein the received RF signal comprises first and second received components from the first and second wireless microphones, respectively, and wherein the first received component is conveyed on a first frequency band and the second received component is conveyed on a second frequency band during a time duration;
splitting the received RF signal into first and second received portions and directing the first and second received portions to the first and second transceivers, respectively;
combining first and second transmitted components from the first and second transceivers, respectively, into a transmitted RF signal for the first and second wireless microphones, respectively; and
transmitting, from the multi-band filter to the first antenna, the transmitted RF signal to the first and second wireless microphones simultaneously on the first and second frequency bands.

20. The method of clause 19 comprising:
assigning a first frequency group to the first transceiver and the second transceiver, wherein the first frequency group comprises a first frequency in the first frequency band, a second frequency in the second frequency band, and third frequency;
assigning a first frequency hopping sequence to the first transceiver, wherein the first transceiver sequences from the first frequency during a first receive sub-frame to the second frequency during a second receive sub-frame; and
assigning a second frequency hopping sequence to the second transceiver, wherein the second transceiver sequences the same frequencies as the first frequency group but the sequence of frequencies does not overlap with any of the frequencies in the first frequency hopping sequence.

21. The method of clause 19 comprising:
sending operational data to the first wireless microphone from the first transceiver, wherein the first wireless microphone transmits the an RF signal to the first transceiver in accordance with the operational data.

22. A wireless microphone system comprising:
at least one frequency manager comprising a primary frequency manager;
the primary frequency manager comprising:
a multi-band filter bi-directionally connected to a first antenna and configured to receive a received radio frequency (RF) signal and to transmit a transmitted RF signal simultaneously on a plurality of frequency bands, wherein the plurality of frequency bands comprises a first frequency band and a second frequency band, wherein the first and second frequency bands are different, wherein the received RF signal comprises first and second received components received first and second wireless microphones, respectively, and wherein the transmitted RF signal comprises first and second transmitted components transmitted to the first and second wireless microphones;

a plurality of transceivers comprising first and second transceivers, the first and second transceivers paired to the first and second wireless microphones, respectively;

an RF splitter/combiner configured to combine the first and second transmitted components from first and second transceivers, respectively, into the transmitted RF signal, to split the received RF signal into first and second received RF portions, respectively, and to direct the first and second received RF portions to the first and second transceivers, respectively; and a frequency manager controller communicating with the first and second transceivers via a data interface to provide information about a first frequency group, wherein the first frequency group comprises a first frequency in the first frequency band and a second frequency in the second frequency band; and the first and second transceivers extracting the first and second received components from the first and second RF portions.

23. The wireless microphone system of clause 22 comprising:

a plurality of wireless microphones comprising the first and second wireless microphones;

the first transceiver sending first data to the first wireless microphone about the first group frequency and a first frequency hopping sequence;

the second transceiver sending second data to the second wireless microphone about the first group frequency and a second frequency hopping sequence;

the first wireless microphone sending the first received component to the primary frequency manager in accordance with the first data; and the second wireless microphone sending the second received component to the primary frequency manager in accordance with the second data, wherein the first and second wireless microphones operate at different frequency bands over a time duration.

24. The wireless microphone system of clause 23 comprising:

the first wireless microphone changing from the first frequency to the second frequency, wherein the first frequency is in the first frequency band and the second frequency are in the second frequency band.

25. The wireless microphone system of clause 22 comprising:

a downstream frequency manager;

third and fourth transceivers;

third and fourth wireless microphones, wherein the third and fourth wireless microphones are paired with the third and fourth transceivers, respectively;

the downstream frequency manager providing third and fourth data to the third and fourth transceivers via the data interface, wherein the third and fourth data includes a second frequency group and includes third and fourth frequency hopping sequences, respectively;

the third and fourth transceivers sending the third and fourth data to the third and fourth wireless microphones, respectively;

the third and fourth wireless microphones sending third and fourth received components to the downstream frequency manager through the primary frequency manager in accordance with the third and fourth data; and the third and fourth transceivers extracting the third and fourth received components from the received RF signal.

26. The wireless microphone system of clause 22 comprising:

a downstream frequency manager;

a fifth transceiver; and the downstream frequency manager providing fifth data to the fifth transceiver via the data interface, wherein the fifth data includes the first frequency group and a non-overlapping frequency hopping sequence.

27. A method for supporting communication with a plurality of wireless microphones by a frequency manager, the plurality of wireless microphones comprising first and second wireless microphones, the method comprising:

pairing, by the frequency manager, the first and second wireless microphones with first and second radios, respectively, wherein the first and second radios comprise first and second receivers, respectively;

receiving, through a first antenna, a received radio frequency (RF) signal from the first and second wireless microphones, wherein the received RF signal comprises first and second received components from the first and second wireless microphones, respectively, and wherein the first received component is conveyed on a first frequency band and the second received component is conveyed on a second frequency band during a same time duration; and directing the received RF signal to the first and second receivers.

28. The method of clause 27 comprising:

extracting, by the first and second receivers, the first and second received components, respectively, from the received RF signal.

29. The method of clause 27, wherein the first and second radios comprise first and second transmitters, respectively, the method comprising:

combining first and second transmitted components from the first and second transmitters, respectively, into a transmitted RF signal for the first and second wireless microphones, respectively, wherein the first and second transmitted components are conveyed in the first and second frequency bands, respectively; and transmitting, through the first antenna, the transmitted RF signal to the first and second wireless microphones simultaneously on the first and second frequency bands.

30. The method of clause 29 comprising:

sending, by the first transmitter, operational data to the first wireless microphone, wherein the first wireless microphone transmits an RF signal to the first receiver in accordance with the operational data.

31. The method of clause 27 comprising:

assigning, by the frequency manager, a first frequency group to the first radio, wherein the first frequency group comprises a first frequency in the first frequency band and a third frequency; and sequencing, by the first radio, from the first frequency during a first sub-frame to the third frequency during a second receive sub-frame.

32. The method of clause 31, wherein the third frequency is in the second frequency band.

33. The method of clause 31 comprising:
assigning, by the frequency manager, a first frequency hopping sequence to the first radio,
wherein the sequencing is in accordance with the first frequency hopping sequence.

34. The method of clause 33 comprising:
assigning a second frequency hopping sequence to the second radio, wherein the second radio sequences the same frequencies as the first frequency group and wherein the second frequency hopping sequence does not overlap any of the frequencies in the first frequency hopping sequence.

35. The method of clause 34, wherein the first radio comprises a first transmitter, the method comprising:
sending, by first transmitter, first data to the first wireless microphone, wherein the first data is indicative of the first group frequency and the first hopping sequence; and
receiving the first received component at the first radio in accordance with the first data.

36. The method of clause 27 further comprising:
connecting the first radio to the first antenna and to a second antenna via first and second ports, respectively.

37. The method of clause 36 further comprising:
periodically attempting, by the frequency manager, to communicate with the first radio via the first port; and
when a response is received via the second port, determining, by the frequency manager, that the first radio is connected to the first port and the second port.

38. The method clause 27 comprising:
determining, by the frequency manager, capabilities of a plurality of connected radios, wherein the plurality of connected radios includes the first and second radios; and
selecting one of the connected radios to serve as a frequency scanner based on the determined capabilities.

39. The method of clause 38 comprising:
determining a set of unoccupied frequencies spanning the first and second frequency bands; and
assigning, by the frequency manager, a subset of the set of unoccupied frequencies to the first radio.

40. An apparatus for managing a frequency spectrum with a plurality of wireless microphones, wherein the plurality of wireless microphones comprises first and second wireless microphones, the apparatus comprising:
an antenna interface circuitry electrically coupled to at least one antenna and configured to receive a received multi-band radio frequency (RF) signal from the plurality of wireless microphones, wherein the received multi-band RF signal comprises a first component generated by the first wireless microphone and a second component generated by the second wireless microphone and wherein the first wireless microphone transmits on a first frequency band and the second wireless microphone transmits on a second frequency band during a same time duration;
an RF processing circuitry electrically connected to the antenna interface circuitry and configured to process the received multi-band RF signal;
an RF distribution circuitry electrically connected to the RF processing circuitry and configured to distribute the received multi-band RF signal to a first and second radio, wherein the first and second radios comprise first and second receivers, respectively and wherein the first and second radios are paired with the first and second wireless microphones, respectively.

41. The apparatus of clause 40, further comprising:
a frequency manager controller, the frequency manager controller further comprising:
a processor; and
a memory device storing computer-executable instructions that, when executed by the processor, cause the frequency manager controller to:
assign a first frequency group to the first radio, wherein the first frequency group comprises a first frequency in the first frequency band and a third frequency; and
assign a first frequency hopping sequence to the first radio, wherein the first radio sequences through frequencies of the first frequency group in accordance with the first frequency hopping sequence.

42. The apparatus of clause 41, further comprising:
a data bus; and
the memory device storing computer-executable instructions that, when executed by the processor, cause the frequency manager controller to:
send first data to the first radio via the data bus, wherein the first data conveys the first frequency group and the first frequency hopping sequence.

43. The apparatus of clause 41, wherein the memory device storing computer-executable instructions that, when executed by the processor, cause the frequency manager controller to:
assign a second frequency hopping sequence to the second radio, wherein the second radio sequences the same frequencies as the first frequency group and wherein the second frequency hopping sequence does not overlap any of the frequencies in the first frequency hopping sequence.

44. The apparatus of clause 42, further comprising:
the memory device storing computer-executable instructions that, when executed by the processor, cause the frequency manager controller to:
determine capabilities of a plurality of connected radios, wherein the plurality of connected radios includes the first and second radios;
select at least one of the connected radios to serve as a frequency scanner based on the determined capabilities;
determine a set of unoccupied frequencies spanning the first and second frequency bands based on second data obtained from the at least one of the connected radios via the data bus; and
assign a subset of the set of unoccupied frequencies to the first radio.

45. The apparatus of clause 43 comprising:
the first radio, wherein the first radio includes a first transmitter configured to:
send third data to the first wireless microphone, wherein the third data is indicative of the first group frequency and the first hopping sequence; and
receive the first received component in accordance with the third data.

46. A non-transitory computer readable medium storing instructions thereon that, when read by a computing device, causes the computing device to:
determine capabilities of a plurality of connected radios, wherein the plurality of connected radios comprise first and second radios;

select at least one of the connected radios from the plurality of connected radios to serve as a frequency scanner based on the determined capabilities;

determine a set of unoccupied frequencies spanning first and second frequency bands based on data obtained from the at least one of the connected radios, wherein the set includes a first frequency in the first frequency band and a second frequency in the second frequency band; and assign a first subset and a second subset of the set of unoccupied frequencies to the first and second radios, respectively, wherein the first and second radios are paired with first and second wireless microphones, respectively, wherein the first subset includes the first frequency in the first frequency band and the second subset includes the second frequency in the second frequency band, and wherein the first and second radios operate at the first and second frequencies during a same time duration.

47. The non-transitory computer readable medium of clause 46, storing instructions thereon that, when read by the computing device, causes the computing device to:

assign a first frequency hopping sequence to the first radio, wherein the first subset spans the first frequency hopping sequence; and assign a second frequency hopping sequence to the second radio, wherein the second subset spans the second frequency hopping sequence, wherein the second radio sequences the same frequencies as the first radio, and wherein the second frequency hopping sequence does not overlap any of the frequencies in the first frequency hopping sequence.

48. The non-transitory computer readable medium of clause 46, wherein the first and second frequency hopping sequences include the second frequency in the second frequency band and the first frequency in the first frequency band, respectively.

49. The non-transitory computer readable medium of clause 46, storing instructions thereon that, when read by the computing device, causes the computing device to:

periodically attempt to communicate with the first radio via a first RF port; and when a response is received via a second RF port, determine that the first radio is connected to the first RF port and the second RF port.

50. The non-transitory computer readable medium of clause 46, storing instructions thereon that, when read by the computing device, causes the computing device to:

attempt to communicate to a first antenna port associated with a first antenna;

when a response is received over a second antenna port associated with a second antenna, interact with an upstream frequency manager; and when no response is received over the second antenna port associated with the second antenna, determine that the first and second antenna ports are directly connected to the first and second antennas, respectively.

What is claimed is:

1. A method for supporting communication with a plurality of wireless microphones by a frequency manager, the plurality of wireless microphones comprising first and second wireless microphones, the method comprising:

pairing, by the frequency manager, the first and second wireless microphones with first and second radios, respectively, wherein the first and second radios comprise first and second receivers, respectively;

receiving, through a first antenna, a received radio frequency (RF) signal from the first and second wireless microphones, wherein the received RF signal comprises first and second received components from the first and second wireless microphones, respectively, and wherein the first received component is conveyed on a first frequency band and the second received component is conveyed on a second frequency band during a same time duration;

directing the received RF signal to the first and second receivers;

determining, by the frequency manager, capabilities of a plurality of connected radios, wherein the plurality of connected radios includes the first and second radios; and selecting one of the connected radios to serve as a frequency scanner based on the determined capabilities.

2. The method of claim 1 comprising:

extracting, by the first and second receivers, the first and second received components, respectively, from the received RF signal.

3. The method of claim 1, wherein the first and second radios comprise first and second transmitters, respectively, the method comprising:

combining first and second transmitted components from the first and second transmitters, respectively, into a transmitted RF signal for the first and second wireless microphones, respectively, wherein the first and second transmitted components are conveyed in the first and second frequency bands, respectively; and transmitting, through the first antenna, the transmitted RF signal to the first and second wireless microphones simultaneously on the first and second frequency bands.

4. The method of claim 3 comprising:

sending, by the first transmitter, operational data to the first wireless microphone, wherein the first wireless microphone transmits an RF signal to the first receiver in accordance with the operational data.

5. The method of claim 1 comprising:

assigning, by the frequency manager, a first frequency group to the first radio, wherein the first frequency group comprises a first frequency in the first frequency band and a third frequency; and sequencing, by the first radio, from the first frequency during a first sub-frame to the third frequency during a second receive sub-frame.

6. The method of claim 5, wherein the third frequency is in the second frequency band.

7. The method of claim 5 comprising:

assigning, by the frequency manager, a first frequency hopping sequence to the first radio, wherein the sequencing is in accordance with the first frequency hopping sequence.

8. The method of claim 7 comprising:

assigning a second frequency hopping sequence to the second radio, wherein the second radio sequences the same frequencies as the first frequency group and wherein the second frequency hopping sequence does not overlap any of the frequencies in the first frequency hopping sequence.

9. The method of claim 8, wherein the first radio comprises a first transmitter, the method comprising:

sending, by first transmitter, first data to the first wireless microphone, wherein the first data is indicative of the first group frequency and the first hopping sequence; and receiving the first received component at the first radio in accordance with the first data.

10. The method of claim 1 further comprising:
connecting the first radio to the first antenna and to a second antenna via first and second ports, respectively.

11. The method of claim 10 further comprising:
periodically attempting, by the frequency manager, to communicate with the first radio via the first port; and
when a response is received via the second port, determining, by the frequency manager, that the first radio is connected to the first port and the second port.

12. The method of claim 1 comprising:
determining a set of unoccupied frequencies spanning the first and second frequency bands; and
assigning, by the frequency manager, a subset of the set of unoccupied frequencies to the first radio.

13. An apparatus for managing a frequency spectrum with a plurality of wireless microphones, wherein the plurality of wireless microphones comprises first and second wireless microphones, the apparatus comprising:
an antenna interface circuitry electrically coupled to at least one antenna and configured to receive a received multi-band radio frequency (RF) signal from the plurality of wireless microphones, wherein the received multi-band RF signal comprises a first component generated by the first wireless microphone and a second component generated by the second wireless microphone and wherein the first wireless microphone transmits on a first frequency band and the second wireless microphone transmits on a second frequency band during a same time duration;
an RF processing circuitry electrically connected to the antenna interface circuitry and configured to process the received multi-band RF signal;
an RF distribution circuitry electrically connected to the RF processing circuitry and configured to distribute the received multi-band RF signal to a first and second radio, wherein the first and second radios comprise first and second receivers, respectively and wherein the first and second radios are paired with the first and second wireless microphones, respectively; and
a frequency manager controller, the frequency manager controller further comprising:
a processor; and
a memory device storing computer-executable instructions that, when executed by the processor, cause the frequency manager controller to:
determine capabilities of a plurality of connected radios, wherein the plurality of connected radios includes the first and second radios; and
select at least one of the connected radios to serve as a frequency scanner based on the determined capabilities.

14. The apparatus of claim 13, wherein the memory device storing computer-executable instructions that, when executed by the processor, cause the frequency manager controller to:
assign a first frequency group to the first radio, wherein the first frequency group comprises a first frequency in the first frequency band and a third frequency; and
assign a first frequency hopping sequence to the first radio, wherein the first radio sequences through frequencies of the first frequency group in accordance with the first frequency hopping sequence.

15. The apparatus of claim 14, further comprising:
a data bus; and
the memory device storing computer-executable instructions that, when executed by the processor, cause the frequency manager controller to:
send first data to the first radio via the data bus, wherein the first data conveys the first frequency group and the first frequency hopping sequence.

16. The apparatus of claim 15, further comprising:
the memory device storing computer-executable instructions that, when executed by the processor, cause the frequency manager controller to:
determine a set of unoccupied frequencies spanning the first and second frequency bands based on second data obtained from the at least one of the connected radios via the data bus; and
assign a subset of the set of unoccupied frequencies to the first radio.

17. The apparatus of claim 14, wherein the memory device storing computer-executable instructions that, when executed by the processor, cause the frequency manager controller to:
assign a second frequency hopping sequence to the second radio, wherein the second radio sequences the same frequencies as the first frequency group and wherein the second frequency hopping sequence does not overlap any of the frequencies in the first frequency hopping sequence.

18. The apparatus of claim 17 comprising:
the first radio, wherein the first radio includes a first transmitter configured to:
send third data to the first wireless microphone, wherein the third data is indicative of the first frequency group and the first hopping sequence; and
receive a first received component in accordance with the third data.

19. A non-transitory computer readable medium storing instructions thereon that, when read by a computing device, causes the computing device to:
determine capabilities of a plurality of connected radios, wherein the plurality of connected radios comprise first and second radios;
select at least one of the connected radios from the plurality of connected radios to serve as a frequency scanner based on the determined capabilities;
determine a set of unoccupied frequencies spanning first and second frequency bands based on data obtained from the at least one of the connected radios, wherein the set includes a first frequency in the first frequency band and a second frequency in the second frequency band;
assign a first subset and a second subset of the set of unoccupied frequencies to the first and second radios, respectively, wherein the first and second radios are paired with first and second wireless microphones, respectively, wherein the first subset includes the first frequency in the first frequency band and the second subset includes the second frequency in the second frequency band, and wherein the first and second radios operate at the first and second frequencies during a same time duration;
assign a first frequency hopping sequence to the first radio, wherein the first subset spans the first frequency hopping sequence; and assign a second frequency hopping sequence to the second radio, wherein the second subset spans the second frequency hopping sequence, wherein the second radio sequences the same frequencies as the first radio, and wherein the second frequency hopping sequence does not overlap any of the frequencies in the first frequency hopping sequence.

20. The non-transitory computer readable medium of claim 19, wherein the first and second frequency hopping sequences include the second frequency in the second frequency band and the first frequency in the first frequency band, respectively.

21. A non-transitory computer readable medium storing instructions thereon that, when read by a computing device, causes the computing device to:
   determine capabilities of a plurality of connected radios, wherein the plurality of connected radios comprise first and second radios;
   select at least one of the connected radios from the plurality of connected radios to serve as a frequency scanner based on the determined capabilities;
   determine a set of unoccupied frequencies spanning first and second frequency bands based on data obtained from the at least one of the connected radios, wherein the set includes a first frequency in the first frequency band and a second frequency in the second frequency band;
   assign a first subset and a second subset of the set of unoccupied frequencies to the first and second radios, respectively, wherein the first and second radios are paired with first and second wireless microphones, respectively, wherein the first subset includes the first frequency in the first frequency band and the second subset includes the second frequency in the second frequency band, and wherein the first and second radios operate at the first and second frequencies during a same time duration;
   periodically attempt to communicate with the first radio via a first RF port; and
   when a response is received via a second RF port, determine that the first radio is connected to the first RF port and the second RF port.

22. A non-transitory computer readable medium storing instructions thereon that, when read by a computing device, causes the computing device to:
   determine capabilities of a plurality of connected radios, wherein the plurality of connected radios comprise first and second radios;
   select at least one of the connected radios from the plurality of connected radios to serve as a frequency scanner based on the determined capabilities;
   determine a set of unoccupied frequencies spanning first and second frequency bands based on data obtained from the at least one of the connected radios, wherein the set includes a first frequency in the first frequency band and a second frequency in the second frequency band;
   assign a first subset and a second subset of the set of unoccupied frequencies to the first and second radios, respectively, wherein the first and second radios are paired with first and second wireless microphones, respectively, wherein the first subset includes the first frequency in the first frequency band and the second subset includes the second frequency in the second frequency band, and wherein the first and second radios operate at the first and second frequencies during a same time duration;
   attempt to communicate to a first antenna port associated with a first antenna;
   when a response is received over a second antenna port associated with a second antenna, interact with an upstream frequency manager; and
   when no response is received over the second antenna port associated with the second antenna, determine that the first and second antenna ports are directly connected to the first and second antennas, respectively.

* * * * *

UNITED STATES PATENT AND TRADEMARK OFFICE
CERTIFICATE OF CORRECTION

PATENT NO. : 10,985,799 B1
APPLICATION NO. : 16/743113
DATED : April 20, 2021
INVENTOR(S) : Mark Allen Kenkel It is certified that error appears in the above-identified patent and that said Letters Patent is hereby corrected as shown below:

On the Title Page

Change Item (12) "Kenkel" to read:
--Kenkel et al.--.

Change Item (72) Inventor to read:
--Mark Allen Kenkel, Schaumburg, IL (US);
Scott N. Brumm, Chicago, IL (US)--.

Signed and Sealed this
Twelfth Day of March, 2024

Katherine Kelly Vidal
*Director of the United States Patent and Trademark Office*